US008857965B2

(12) United States Patent
Ikeda et al.

(10) Patent No.: US 8,857,965 B2
(45) Date of Patent: *Oct. 14, 2014

(54) INK COMPOSTION, RECORDING METHOD USING THE SAME AND RECORDED MATERIAL

(75) Inventors: Yasunari Ikeda, Shiojiri (JP); Yasuhiro Oki, Matsumoto (JP); Kazuhiko Kitamura, Matsumoto (JP); Shigemi Wakabayashi, Shiojiri (JP); Ryosuke Teramoto, Matsumoto (JP); Hiromi Iseki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 13/315,701

(22) Filed: Dec. 9, 2011

(65) Prior Publication Data

US 2012/0147084 A1 Jun. 14, 2012

(30) Foreign Application Priority Data

Dec. 10, 2010 (JP) .................................. 2010-275459
Dec. 10, 2010 (JP) .................................. 2010-275460

(51) Int. Cl.
C09D 11/00 (2014.01)
C09D 11/38 (2014.01)
C09B 47/067 (2006.01)
C09B 47/06 (2006.01)
C09D 11/328 (2014.01)

(52) U.S. Cl.
CPC ............ *C09D 11/38* (2013.01); *C09B 47/0678* (2013.01); *C09B 47/065* (2013.01); *C09D 11/328* (2013.01)
USPC ....................................................... 347/100

(58) Field of Classification Search
USPC ........................................................ 347/100
See application file for complete search history.

(56) References Cited

U.S. PATENT DOCUMENTS

| 5,354,369 | A | 10/1994 | Shimomura et al. |
| 5,507,865 | A | 4/1996 | Yoshida et al. |
| 6,379,441 | B1 | 4/2002 | Kanaya et al. |
| 7,083,669 | B2 * | 8/2006 | Fukumoto et al. ......... 106/31.49 |
| 7,087,107 | B2 | 8/2006 | Tateishi et al. |
| 7,211,134 | B2 | 5/2007 | Tateishi et al. |
| 7,219,988 | B2 | 5/2007 | Hanaki et al. |
| 7,276,111 | B2 * | 10/2007 | Oki et al. ................... 106/31.49 |
| 7,279,034 | B2 * | 10/2007 | Oki et al. ................... 106/31.58 |
| 7,303,616 | B2 * | 12/2007 | Oki et al. ................... 106/31.49 |
| 7,585,361 | B2 | 9/2009 | Yoneda et al. |
| 7,591,888 | B2 | 9/2009 | Fujii et al. |
| 7,691,192 | B2 | 4/2010 | Oki et al. |
| 2006/0135646 | A1 | 6/2006 | Oki et al. |
| 2007/0022903 | A1 | 2/2007 | Fujii et al. |
| 2008/0022895 | A1 * | 1/2008 | Oki et al. ................... 106/31.49 |
| 2011/0090278 | A1 | 4/2011 | Yoneda et al. |
| 2012/0081457 | A1 * | 4/2012 | Ooshima et al. ................. 347/20 |
| 2012/0148807 | A1 * | 6/2012 | Ikeda et al. ................. 428/195.1 |

FOREIGN PATENT DOCUMENTS

| CA | 2764876 A1 | 12/2010 |
| CN | 1717458 A | 1/2006 |
| CN | 1886473 A | 12/2006 |
| CN | 101415782 A | 4/2009 |
| EP | 1 357 158 A1 | 10/2003 |
| EP | 1 676 891 A1 | 7/2006 |
| EP | 1 985 668 A1 | 10/2008 |
| JP | 2004-2670 A | 1/1990 |
| JP | 06-25575 A | 2/1994 |
| JP | 07-228810 A | 8/1995 |
| JP | 2002-249677 A | 9/2002 |
| JP | 2003-213167 A | 7/2003 |
| JP | 2003-213168 A | 7/2003 |
| JP | 2004-263155 A | 9/2004 |
| WO | 99-50363 A1 | 10/1999 |
| WO | 2007-091631 A | 8/2007 |
| WO | 2007-116933 A | 10/2007 |
| WO | 2010/001559 A1 | 1/2010 |
| WO | 2010/143619 A1 | 12/2010 |
| WO | WO 2010143619 A1 * | 12/2010 |

OTHER PUBLICATIONS

Extended Europan Search Report issued Mar. 19, 2012 for Application No. 11192559.0 (5 Pages).

* cited by examiner

*Primary Examiner* — Laura Martin

(74) *Attorney, Agent, or Firm* — Nutter McClennen & Fish LLP; John J. Penny, Jr.; Taylor M. Coon

(57) ABSTRACT

Disclosed are an ink composition at least containing a porphyrazine compound or a salt thereof and an aromatic compound having a carboxy group and/or a salt thereof, an ink jet recording method using the ink composition and a recorded material recorded by the recording method.

18 Claims, No Drawings

INK COMPOSTION, RECORDING METHOD USING THE SAME AND RECORDED MATERIAL

The entire disclosure of Japanese Application No.: 2010-275459 filed on Dec. 10, 2010 and 2010-275460 filed on Dec. 10, 2010 are expressly incorporated by reference herein.

BACKGROUND

1. Technical Field

The present invention relates to an ink composition suitable for ink jet recording, in particular, an ink composition with superior ozone resistance, bronzing resistance and coloring property, an ink jet recording method using the same and a recorded material recorded by the recording method.

2. Related Art

Ink jet recording is a method for recording text or images (hereinafter, simply referred to as an "image") on the surface of a recording medium by ejecting droplets of an ink composition from a fine nozzle. As the ink jet recording method, a method for recording text or an image on the surface of a recording medium by converting electric signals into mechanical signals using an electrostrictive device and intermittently ejecting an ink composition stored in a nozzle head, a method for recording text or an image on the surface of a recording medium by rapidly heating a region immediately adjacent to the ejection part to foam an ink composition stored in a nozzle head and intermittently ejecting the ink composition through volume expansion due to the foam or the like is practically applied.

In addition, as ink compositions for ink jet recording, solutions of a variety of dyes in water or an organic solvent, or a mixture thereof are generally used in terms of safety or printing properties. Taking into consideration various properties, ink compositions for ink jet recording are required to conform to more stringent conditions, as compared to ink compositions for writing implements such as fountain pens or ball pens.

In particular, recently, ink jet printers have often been used for producing advertising prints, and there is a demand for more stringent requirements, when color images are formed using a plurality of ink compositions.

The reason is that, when there is even one color with a low coloring property in color images formed using the plurality of ink compositions, the overall color balance deteriorates due to the color in the image and high-quality images cannot be thus obtained.

In an ink composition (in particular, an ink composition employing a metal phthalocyanine dye as a coloring material), a red phenomenon (hereinafter, referred to as a "bronzing phenomenon") may be observed in a region where high-duty printing such as beta printing (fill printing) is performed. In this case, the overall color balance of images is imbalanced and image quality is thus deteriorated. Accordingly, improvement of the composition is required.

In addition, recently, gloss paper has commonly been used as a recording medium having a texture with a tone like a photo. However, a specific color causes bronzing, leading to imbalance of gloss texture on the surface of printed materials and thus considerable deterioration in the texture of images. In terms of maintenance of the overall gloss texture of images, there is a strong requirement for improvement of the composition.

In addition, ink compositions which exhibit superior light resistance and gas resistance, when printed materials formed using the ink compositions may be mounted indoors as well as outdoors and are thus exposed to sunlight as well as a variety of light or the external atmosphere (ozone, nitrogen oxide, sulfur oxide or the like), have been developed. In particular, cyan ink compositions in which gas resistance is improved in terms of intrinsic properties of the dye, exhibit a remarkable bronzing phenomenon. Improvement of the ink compositions is required.

In addition, it is known that, when the ink composition for ink jet recording which uses a dye having a lack of solubility in water is printed on highly acidic recording media, a so-called "bronzing phenomenon" occurs.

As this method for solving the problem, addition of alcohol amines such as a pH adjuster or improvement of permeation strength into paper is generally performed. Basically, the bronzing phenomenon is caused by an ink composition being dried on the surface of paper and the dye thus being crystallized. This method is effective in that solubility is improved to prevent crystallization or the ink composition permeates into paper before crystallization. However, the former is not a perfect solution, since pH easily increases to about 11 by addition, a printer nozzle is corroded, and the method may have an effect on humans. The latter is not a perfect solution; since when there is an excessive increase in permeability, another printing quality, a so-called "bleeding phenomenon" or the like, is deteriorated.

As an alternative to these methods to solve these problems, an ink composition containing a 2-oxo-oxazolidone or 1,3-bis(β-hydroxyethyl)urea is suggested (for example, see JP-A-6-25575).

In addition, an ink composition containing a basic amino acid to solve the problems is suggested (for example, see JP-A-7-228810).

In addition, an ink composition containing a phthalocyanine compound with ozone resistance is suggested (for example, see JP-A-2004-263155).

However, as a result of a variety of investigations and research, the present inventors found that an ink composition exhibits superior ozone resistance and bronzing resistance, but does not impart high printing intensity in spite of using the solutions described above.

SUMMARY

An advantage of some aspects of the invention is to provide an ink composition which exhibits superior ozone resistance and bronzing resistance and imparts high printing intensity, an ink jet recording method using the same and a recorded material obtained by the recording method.

Another advantage of some aspects of the invention is to provide an ink composition which exhibits superior ozone resistance and bronzing resistance, imparts high printing intensity, and prevents clogging in nozzles, an ink jet recording method using the same and a recorded material obtained by the recording method.

The present inventors thoroughly reviewed an ink jet ink composition which has good coloring property, superior ozone resistance, and is free of a bronzing phenomenon. As a result, the present inventors can solve the problem using an ink composition containing a porphyrazine compound represented by the following Formula (1) and an aromatic compound having a carboxy group and/or a salt thereof. The invention has been completed, based on this discovery.

That is, the aspects are accomplished by the following inventions.

Application 1

An ink composition containing a porphyrazine compound represented by Formula (1) below or a salt thereof and an aromatic compound having a carboxy group and/or a salt thereof.

[Chem. 1]

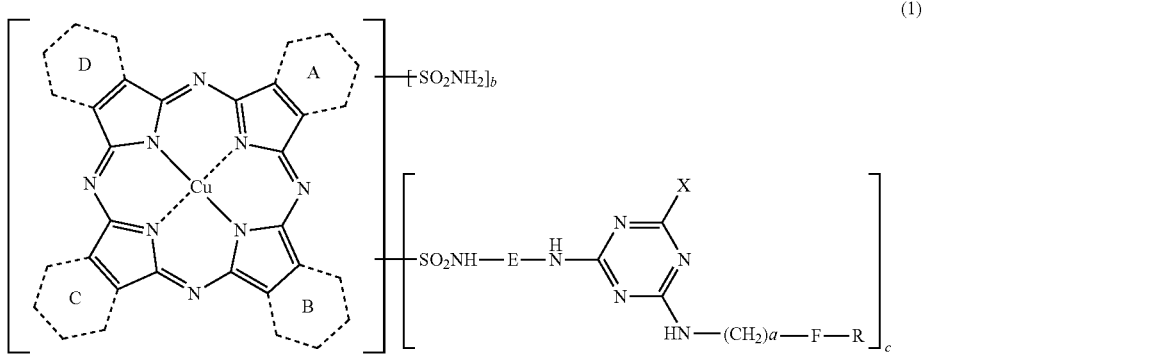

(1)

(wherein rings A to D represented by broken lines each independently represent a benzene ring or a 6-membered nitrogen-containing heteroaromatic ring, each of which is condensed with a porphyrazine ring, wherein the average value of the number of the nitrogen-containing heteroaromatic rings is higher than 0.00 and equal to or lower than 3.00, and the remaining are benzene rings, E represents a C2-C12 alkylene, X represents a sulfoanilino group, a carboxyanilino group, a phosphonoanilino group, a sulfonaphthylamino group, a carboxynaphthylamino group or a phosphononaphthylamino group, each of which may have one or two substituent groups selected from the group consisting of a sulfo group, a carboxy group, a phosphate group, a sulfamoyl group, a carbamoyl group, a hydroxy group, a C1-C6 alkoxy group, an amino group, a mono(C1-C4)alkylamino group, a di(C1-C4)alkylamino group, a mono(C6-C10)arylamino group, a di(C6-C10)arylamino group, a C1-C3 alkylcarbonylamino group, a ureide group, a C1-C6 alkyl group, a nitro group, a cyano group, a halogen atom, a C1-C6 alkylsulfonyl group, and a C1-C6 alkylthio group, R represents a hydrogen atom; a sulfo group; a carboxy group; a phosphate group; a sulfamoyl group; a carbamoyl group; a hydroxy group; a C1-C6 alkoxy group; an amino group; a mono(C1-C6)alkylamino group; a di(C1-C6)alkylamino group; a monoarylamino group; a diarylamino group; a C1-C3 alkylcarbonylamino group; a ureide group; a C1-C6 alkyl group; a nitro group; a cyano group; a halogen atom; a C1-C6 alkylsulfonyl group; or an alkylthio group, F (group) represents a phenyl group, or a 6-membered nitrogen-containing heteroaromatic ring, a represents an integer of 1 to 6, b represents an average value equal to or higher than 0.00 and lower than 3.90, c represents an average value equal to or higher than 0.10 and lower than 4.00, and an average value of a total of b and c is equal to or higher than 1.00 and is lower than 4.00.)

Application 2

The ink composition according to Application 1, wherein, in the porphyrazine compound represented by Formula (1) or a salt thereof, the nitrogen-containing heteroaromatic ring of rings A to D each independently represents a pyridine ring condensed at 2-position and 3-position, or 3-position and 4-position; or a pyrazine ring condensed at 2-position and 3-position, E represents linear C2-C4 alkylene, X represents a sulfoanilino group which may contain, as a substituent group, 1 or 2 types of 0 to 2 substituent groups selected from the group consisting of a sulfo group, a carboxy group, a hydroxy group, a C1-C6 alkoxy group, an amino group, a mono(C1-C4)alkylamino group, a di(C1-C4)alkylamino group, a C1-C3 alkylcarbonylamino group, a nitro group, a halogen atom, a C1-C6 alkylsulfonyl group and an alkylthio group; a carboxyanilino group which may contain, as a substituent group, 1 or 2 types of 0 to 2 substituent groups selected from the group consisting of a sulfo group, a carboxy group, a hydroxy group, and a sulfamoyl group; a phosphonoanilino group; or a sulfonaphthylamino group which may contain, as a substituent group, 1 or 2 types of 0 to 2 substituent groups selected from the group consisting of a sulfo group and a hydroxy group, R represents a hydrogen atom; a sulfo group; a carboxy group; a C1-C6 alkoxy group; a C1-C6 alkyl group; or a halogen atom, F (group) represents a phenyl group; or a pyridyl group in which R represents a hydrogen atom, a represents an integer of 1 or 2.

Application 3

The ink composition according to Applications 1 or 2, wherein in the porphyrazine compound represented by Formula (1) or a salt thereof, the nitrogen-containing heteroaromatic ring of rings A to D each independently represents a pyridine ring condensed at 2-position and 3-position, E represents ethylene, X represents a sulfoanilino group which may contain zero to one sulfo group as a substituent group; or a sulfonaphthylamino group which may contain two sulfo groups as substituent groups, R represents a hydrogen atom, a sulfo group or a carboxy group, F (group) represents a phenyl group, or a pyridyl group in which R represents a hydrogen atom, a represents an integer of 1, b represents an average value equal to or higher than 0.00 and lower than 3.90, c represents an average value equal to or higher than 0.10 and lower than 4.00, and an average value of a total of b and c is equal to or higher than 1.00 and is lower than 4.00.

Application 4

The ink composition according to anyone of Applications 1 to 3, wherein the aromatic compound having a carboxy group and/or a salt thereof is a compound having a naphthalene skeleton and/or a salt thereof.

Application 5

The ink composition according to anyone of Applications 1 to 4, wherein the compound having a naphthalene skeleton and/or a salt thereof is one or two selected from the group consisting of 1-hydroxy-2-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid and salts thereof.

Application 6

The ink composition according to anyone of Applications 1 to 5, wherein the aromatic compound having a carboxy group and/or a salt thereof is present in an amount of 0.1 to 10% by mass, based on the total amount of the ink composition.

Application 7

The ink composition according to Application 1, further containing a compound represented by Formula (2) below.

[Chem. 2]

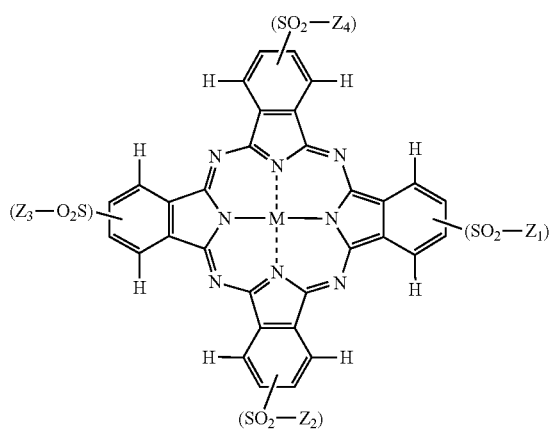

(2)

(wherein M represents a hydrogen atom, a metal element, metal oxide, metal hydroxide, or metal halide, $Z_1$ to $Z_4$ each independently represent an alkyl group, a cycloalkyl group, an alkenyl group, an aralkyl group, an aryl group, or a heterocyclic group, particularly, an alkyl group, an aryl group or a heterocyclic group, each of which may further have a substituent group.)

Application 8

The ink composition according to anyone of Applications 1 to 7, wherein the aromatic compound having a carboxy group is a lithium salt.

Application 9

The ink composition according to anyone of Applications 1 to 8, further containing a nonionic surfactant.

Application 10

The ink composition according to anyone of Applications 1 to 9, further containing a permeation accelerator.

Application 11

An ink jet recording method including ejecting droplets of an ink composition and adhering the droplets to a recording medium to perform recording, wherein the ink composition according to anyone of Applications 1 to 10 is used as the ink composition.

Application 12

A recorded material recorded using the ink composition according to anyone of Applications 1 to 10 or recorded by the recording method according to Application 11.

DESCRIPTION OF EXEMPLARY EMBODIMENTS

The present invention will be described in detail. The porphyrazine compound contained in an ink according to the invention is represented by Formula (1).

That is, tetrabenzoporphyrazine (commonly, called "phthalocyanine") is a compound in which one to three of four benzo (benzene) rings are replaced with a nitrogen-containing heteroaromatic ring. In addition, in this specification, for convenience, the porphyrazine compound includes "porphyrazine compound or a salt thereof of the invention" and is simply referred to "porphyrazine compound of the invention" below.

In Formula (1), in rings A to D (four rings of rings A, B, C and D) represented by broken lines, examples of the nitrogen-containing heteroaromatic rings include nitrogen-containing heteroaromatic rings containing one or two nitrogen atoms such as pyridine, pyrazine, pyrimidine and pyridazine rings. Of these, a pyridine or pyrazine ring is preferred, and a pyridine ring is more preferred. As the number of nitrogen-containing heteroaromatic rings increases, ozone resistance is improved, but bronzing readily occurs. Taking into consideration ozone resistance and bronzing, the number of nitrogen-containing heteroaromatic rings is suitably controlled and a ratio to make a balance is thus selected.

The number of nitrogen-containing heteroaromatic rings may be varied since it depends on the type of heterocycle. The number (on average) is typically higher than 0.00 and equal to or lower than 3.00, preferably 0.20 to 2.00, more preferably 0.50 to 1.75, even more preferably 0.75 to 1.50.

The remaining of rings A to D are benzene rings, and the number (on average) of the benzene rings of the rings A to P is commonly equal to or higher than 1.00 and lower than 4.00, preferably 2.00 to 3.80, more preferably 2.25 to 3.50, even more preferably 2.50 to 3.25. In addition, as apparent from an average value of the number of the nitrogen-containing heteroaromatic rings of rings A to D, the porphyrazine compound of the invention is a mixture of a plurality of compounds.

In addition, unless specifically mentioned in the specification, the number of nitrogen-containing heteroaromatic rings is calculated to two decimal places by rounding off the number from three decimal places. For example, assuming that the nitrogen-containing heteroaromatic ring or the number thereof is 1.375 and the number of benzene rings is 2.625, the values obtained by rounding off the former and the latter are 1.38 and 2.63, respectively, and a total of the values is higher than 4.00 of a total of the rings A and D.

In this case, for convenience, the three decimal places of the value of the nitrogen-containing heteroaromatic ring are cut and only the number of the benzene rings is rounded off to the nearest integer to obtain 1.37 (for the former) and 2.63 (for the latter), respectively. In addition, as a rule, b and c in Formula (1) are rounded off to three decimal places and are thus calculated to two decimal places as described below. In this case, three decimal place of b are cut and only c is rounded off to the nearest integer.

In Formula (1), examples of alkylene for E include straight, branched and cyclic alkylene, straight or cyclic alkylene is preferred and straight alkylene is more preferred. The range of carbon atom number is commonly C2-C12, preferably C2-C6, more preferably C2-C4, even more preferably C2-C3.

Specific examples thereof include straight alkylenes such as ethylene, propylene, butylene, pentylene, hexylene, heptylene, octylene, nonylene, decylene, undecylene, dodecylene; branched alkylenes such as 2-methylethylene; cyclic alkylenes such as cyclopropylenediyl, 1,2- or 1,3-cyclopentylenediyl, 1,2-, 1,3- or 1,4-cyclohexylenediyl and the like. Preferred is ethylene, propylene, butylene, pentylene, or hexylene, more preferred is ethylene, propylene, or butylene, even more preferred is ethylene or propylene, and particularly preferred is ethylene.

In Formula (1), X represents a sulfoanilino group, a carboxyanilino group, a phosphonoanilino group, a sulfonaphthylamino group, a carboxynaphthylamino group or a phosphononaphthylamino group. The number of substituted sulfo, carboxy and phosphono groups in the anilino group and the naphthylamino group is one. Specific examples thereof include sulfoanilino groups such as 2-sulfoanilino, 3-sulfoanilino and 4-sulfoanilino groups; carboxyanilino groups such as 2-carboxyanilino, 3-carboxyanilino and 4-carboxyanilino groups; phosphonoanilino groups such as 2-phosphonoanilino, 3-phosphonoanilino and 4-phosphonoanilino groups; sulfonaphthylamino groups such as 3-sulfo-1-naphthylamino, 6-sulfo-1-naphthylamino, 8-sulfo-1-naphthylamino, 1-sulfo-2-naphthylamino, 3-sulfo-2-naphthylamino, 4-sulfo-2-naphthylamino, 5-sulfo-2-naphthylamino, 6-sulfo-2-naphthylamino, 7-sulfo-2-naphthylamino and 8-sulfo-2-naphthylamino groups and the like.

In addition, the term "phosphono" means a phosphate group [—P(O)(OH)$_2$].

X is preferably a sulfoanilino group, a carboxyanilino group, a phosphonoanilino group, or a sulfonaphthylamino group and is particularly preferably a sulfoanilino group.

The sulfoanilino group, the carboxyanilino group, phosphonoanilino group, the sulfonaphthylamino group, the carboxynaphthylamino group or the phosphononaphthylamino group used as X further contains, as a substituent group, one or two or more groups selected from a sulfo group; a carboxy group; a phosphate group; a sulfamoyl group; a carbamoyl group, a hydroxy group; a C1-C6 alkoxy group; an amino group; a mono(C1-C4)alkylamino group; di(C1-C4) alkylamino group; a monoarylamino group; a diarylamino group; a C1-C3 alkylcarbonylamino group; a ureide group; a C1-C6 alkyl group; a nitro group; a cyano group; a halogen atom; a C1-C6 alkylsulfonyl group; and a C1-C6 alkylthio group. The 20 groups from the sulfo group to the C1-C6 alkylthio group exemplified herein will be simply referred to as a "group consisting of 20 substituent groups". The number of the groups selected from the group consisting of 20 substituent groups in X is commonly 0 to 4, preferably 0 to 3, more preferably 0 to 2, even more preferably 0 or 1. The substitution position of one selected from the group consisting of 20 substituent groups is particularly not limited, but the group may be substituted on a carbon atom of the anilino group and the naphthylamino group, that is, the anilino group may be substituted at a benzene ring and the naphthylamino group may be substituted at a naphthalene ring.

The C1-C6 alkoxy group of the group consisting of 20 substituent groups may be a straight, branched or cyclic C1-C6 alkoxy group. A straight or branched C1-C6 alkoxy group is preferred, and a straight C1-C6 alkoxy group is more preferred.

The range of number of carbon atoms is commonly C1-C6, preferably C1-C4, more preferably C1-C3.

Specific examples thereof include straight C1-C6 alkoxy groups such as methoxy, ethoxy, n-propoxy, n-butoxy, n-pentoxy, and n-hexyloxy; branched C1-C6 alkoxy groups such as isopropoxy, isobutoxy, sec-butoxy, t-butoxy, isopentyloxy, and isohexyloxy; cyclic C1-C6 alkoxy groups such as cyclopropoxy, cyclopentoxy, and cyclohexyloxy. Of these, methoxy or ethoxy is preferred and methoxy is particularly preferred.

Of the group consisting of 20 substituent groups, the mono(C1-C4)alkylamino group may be a straight or branched mono(C1-C4)alkylamino group; the range of the number of carbon atoms is commonly C1-C4, preferably C1-C3. Specific examples of the mono(C1-C4)alkylamino group include straight mono(C1-C4)alkylamino groups such as methylamino, ethylamino, n-propylamino, and n-butylamino; and branched mono(C1-C4)alkylamino groups such as isopropylamino, isobutylamino, sec-butylamino and t-butylamino. Of these, methylamino is preferred.

Of the group consisting of 20 substituent groups, the di(C1-C4)alkylamino group may be a dialkylamino group having independently two alkyl moieties exemplified as the monoalkylamino group. Specific examples thereof include dimethylamino, diethylamino, methylethylamino and the like. Of these, dimethylamino is most preferred.

Of the group consisting of 20 substituent groups, the monoarylamino group may be a mono(C6-C10) aromatic amino group, preferably a phenylamino group or a naphthylamino group, more preferably a phenylamino group.

Of the group consisting of 20 substituent groups, the diarylamino group may be a diarylamino group having independently two aryl moieties exemplified as the monoarylamino group. A diarylamino group having two identical aryl groups (more preferably, two identical phenyl groups) is preferred and specific examples thereof include diphenylamino.

Of the group consisting of 20 substituent groups, the C1-C3 alkylcarbonylamino group may be a straight or branched C1-C3 alkylcarbonylamino group, and a straight C1-C3 alkylcarbonylamino group is preferred. Specific examples thereof include straight C1-C3 alkylcarbonylamino groups such as methylcarbonylamino (acetylamino), ethylcarbonylamino, and n-propylcarbonylamino; and branched C1-C3 alkylcarbonylamino groups such as isopropylcarbonylamino. Of these, acetylamino is preferred.

Of the group consisting of 20 substituent groups, the C1-C6 alkyl group may be a straight, branched or cyclic C1-C6 alkyl group, preferably a C1-C4 alkyl group, more preferably a C1-C3 alkyl group. A straight or branched alkyl group is preferred and a straight alkyl group is more preferred. Specific examples thereof include straight alkyl groups such as methyl, ethyl, n-propyl, n-butyl, n-pentyl, and n-hexyl; branched alkyl groups such as isopropyl, isobutyl, sec-butyl, t-butyl, isopentyl, isohexyl; and cyclic alkyl groups such as cyclopropyl, cyclopentyl and cyclohexyl. Of these, methyl is preferred.

Of the group consisting of 20 substituent groups, the halogen atom includes a fluorine atom, a chlorine atom, a bromine atom or the like, and a fluorine or chlorine atom is preferred and a chlorine atom is more preferred.

Of the group consisting of 20 substituent groups, the C1-C6 alkylsulfonyl group may be a straight or branched C1-C6, preferably C1-C4, more preferably C1-C3 alkylsulfonyl group and a straight C1-C6 alkylsulfonyl group is preferred. Specific examples thereof include straight C1-C6 alkylsulfonyl groups such as methanesulfonyl (methylsulfonyl), ethanesulfonyl (ethylsulfonyl), n-propanesulfonyl (n-propylsulfonyl), n-butylsulfonyl, n-pentylsulfonyl, n-hexylsulfonyl; and branched C1-C6 alkylsulfonyl groups such as isopropylsulfonyl and isobutylsulfonyl. Of these, methylsulfonyl is preferred.

Of the group consisting of 20 substituent groups, the C1-C6 alkylthio group may be a straight or branched C1-C6 alkylthio group, and is preferably a C1-C4 alkylthio group, more preferably a C1-C3 alkylthio group. A straight alkylthio group is preferred. Specific examples thereof include straight alkylthio groups such as methylthio, ethylthio, n-propylthio, n-butylthio, n-pentylthio, and n-hexylthio; and branched alkylthio groups such as isopropylthio, isobutylthio, t-butylthio, isopentylthio and isohexylthio. Of these, methylthio is preferred.

When X is a sulfoanilino group, of the group consisting of 20 substituent groups, a sulfo group, a carboxy group, a hydroxy group, a C1-C6 alkoxy group, an amino group, a mono(C1-C4)alkylamino group, a di(C1-C4)alkylamino group, a C1-C3 alkylcarbonylamino group, a C1-C6 alkyl group, a nitro group, a halogen atom, a C1-C6 alkylsulfonyl group and a C1-C6 alkylthio group are preferred and a sulfo group is particularly preferred.

When X is a carboxyanilino group, of the group consisting of 20 substituent groups, a sulfo group, a carboxy group, a hydroxy group and a sulfamoyl group are preferred.

When X is a phosphonoanilino group, it is preferable that it has no group selected from the group consisting of 20 substituent groups.

When X is a sulfonaphthylamino group, of the group consisting of 20 substituent groups, a sulfo group and a hydroxy group are preferred.

When X is a carboxynaphthylamino group, or phosphononaphthylamino group, it is preferable that it has no group selected from the group consisting of 20 substituent groups.

Specific examples of X in Formula (1) include sulfoanilino groups further containing 0 or 1 sulfo group such as 2-sulfoanilino, 3-sulfoanilino, 4-sulfoanilino, 2,4-disulfoanilino and 2,5-disulfoanilino; sulfoanilino groups further containing one carboxy group such as 2-carboxy-4-sulfoanilino, and 2-carboxy-5-sulfoanilino (or, carboxyanilino groups further containing one sulfo group); sulfoanilino groups further containing one C1-C6 alkoxy group such as 4-methoxy-2-sulfoanilino, 4-ethoxy-2-sulfoanilino, and 4-ethoxy-6-sulfoanilino; sulfoanilino groups further containing one amino group such as 3-amino-4-sulfoanilino; sulfoanilino groups further containing one mono(C1-C4)alkylamino group such as 4-methylamino-5-sulfoanilino; sulfoanilino groups further containing one di(C1-C4)alkylamino group such as 4-dimethylamino-5-sulfoanilino; sulfoanilino groups further containing one C1-C6 alkyl group such as 2-methyl-5-sulfoanilino, and 3-methyl-6-sulfoanilino; sulfoanilino groups further containing one arylamino group such as 4-anilino-3-sulfoanilino; sulfoanilino groups further containing one C1-C3 alkylcarbonylamino group such as 4-acetylamino-2-sulfoanilino; sulfoanilino groups further containing 1 or 2 halogen atoms such as 2-chloro-5-sulfoanilino, and 3,5-dichloro-4-sulfoanilino; sulfoanilino groups further containing one C1-C6 alkylsulfonyl group such as 4-methylsulfonyl-2-sulfoanilino, 4-methylsulfonyl-5-sulfoanilino, and 4-hexylsulfonyl-2-sulfoanilino; sulfoanilino groups further containing one C1-C6 alkylthio group such as 4-methylthio-2-sulfoanilino, and 4-hexylthio-2-sulfoanilino; sulfoanilino groups further containing two groups selected from the group consisting of 20 substituent groups such as 3-carboxy-4-hydroxy-5-sulfoanilino, 2-hydroxy-5-nitro-3-sulfoanilino, 2-methoxy-4-nitro-5-sulfoanilino, 3-methyl-6-methoxy-4-sulfoanilino, and 2-hydroxy-3-acetylamino-5-sulfoanilino; carboxyanilino groups further containing 0 or 1 carboxy group such as 2-carboxyanilino, 3-carboxyanilino, 4-carboxyanilino, and 3,5-dicarboxyanilino; carboxyanilino groups further containing one sulfamoyl group such as 4-sulfamoyl-2-carboxyanilino; carboxyanilino groups further containing one hydroxy group such as 3-carboxy-4-hydroxyanilino; carboxyanilino groups further containing two groups of two types selected from the group consisting of 20 substituent groups such as 4-hydroxy-3-sulfo-5-carboxyanilino; phosphonoanilino groups such as 2-phosphonoanilino, 3-phosphonoanilino, and 4-phosphonoanilino; sulfonaphthylamino groups further containing one to two sulfo groups such as 4,8-disulfo-2-naphthylamino, 1,5-disulfo-2-naphthylamino, 3,6-disulfo-1-naphthylamino, 5,7-disulfo-2-naphthylamino, 6,8-disulfo-2-naphthylamino, 3,6,8-trisulfo-1-naphthylamino, 3,6,8-trisulfo-2-naphthylamino; sulfonaphthylamino groups further containing one hydroxy group such as 5-hydroxy-7-sulfo-2-naphthylamino; sulfonaphthylamino groups containing further two groups of two types selected from the group consisting of 20 substituent groups such as 3,6-disulfo-8-hydroxy-1-naphthylamino, 8-chloro-3,6-disulfonaphthalen-1-ylamino, and 6-nitro-4,8-disulfo-2-naphthylamino.

Of these, 2-sulfoanilino, 3-sulfoanilino, 4-sulfoanilino, 2,4-disulfoanilino, 2,5-disulfoanilino, 3,6-disulfo-1-naphthylamino, 5,7-disulfo-2-naphthylamino, 6,8-disulfo-2-naphthylamino, and 3,6,8-trisulfo-1-naphthylamino are preferred, 4-sulfoanilino, 2,5-disulfoanilino, or 3,6,8-trisulfo-1-naphthylamino is more preferred and 2,5-disulfoanilino is further more preferred.

R in Formula (1) represents a hydrogen atom, a sulfo group; a carboxy group; a phosphate group; a sulfamoyl group; a carbamoyl group; a hydroxy group; a C1-C6 alkoxy group; an amino group; a mono(C1-C6)alkylamino group; a di(C1-C6)alkylamino group; a mono(C6-C10)arylamino group; a di(C6-C10)arylamino group; a C1-C3 alkylcarbonylamino group; a ureide group; a C1-C6 alkyl group; a nitro group; a cyano group; a halogen atom; a C1-C6 alkylsulfonyl group; or an alkylthio group.

The C1-C6 alkoxy group of R may be a straight, branched or cyclic C1-C6 alkoxy group and is preferably a C1-C4 alkoxy group, more preferably a C1-C3 alkoxy group. A straight or branched alkoxy group is preferred, and a straight alkoxy group is more preferred. Specific examples thereof include straight alkoxy groups such as methoxy, ethoxy, n-propoxy, n-butoxy, n-pentoxy, and n-hexyloxy; branched alkoxy groups such as isopropoxy, isobutoxy, sec-butoxy, t-butoxy, isopentyloxy, and isohexyloxy; cyclic alkoxy groups such as cyclopropoxy, cyclopentoxy, and cyclohexyloxy. Of these, methoxy or ethoxy is preferred and methoxy is particularly preferred.

The mono(C1-C4)alkylamino group of R may be a straight or branched mono(C1-C4)alkylamino group and the range of carbon number is commonly C1-C4 and preferably C1-C3. Specific examples thereof include straight mono(C1-C4) alkylamino groups such as methylamino, ethylamino, n-propylamino, and n-butylamino; and branched mono(C1-C4) alkylamino groups such as isopropylamino, isobutylamino, sec-butylamino, and t-butylamino.

The di(C1-C4)alkylamino group of R may be a dialkylamino group independently containing two alkyl moieties exemplified as the monoalkylamino group. Specific examples thereof include dimethylamino, diethylamino, methylethylamino and the like.

The mono(C6-C10)arylamino group of R may be a mono (C6-C10) aromatic amino group and is preferably a phenylamino group or a naphthylamino group, more preferably a phenylamino group.

The di(C6-C10)arylamino group of R may be a diarylamino group independently containing two aryl moieties exemplified as the monoarylamino group. Preferably, the di(C6-C10)arylamino group is a diarylamino group containing two identical aryl groups (more preferably two identical phenyl groups) and specific examples thereof include diphenylamino.

The C1-C3 alkylcarbonylamino group of R may be a straight or branched C1-C3 alkylcarbonylamino group and a straight C1-C3 alkylcarbonylamino group is preferred. Specific examples thereof include straight C1-C3 alkylcarbonylamino groups such as methylcarbonylamino (acetylamino), ethylcarbonylamino, n-propylcarbonylamino; and branched C1-C3 alkylcarbonylamino groups such as isopropylcarbonylamino.

The C1-C6 alkyl group of R may be a straight, branched or cyclic C1-C6 alkyl group, preferably a C1-C4 alkyl group, more preferably a C1-C3 alkyl group. A straight or branched alkyl group is preferred, and a straight alkyl group is more preferred. Specific examples thereof include straight alkyl groups such as methyl, ethyl, n-propyl, n-butyl, n-pentyl, n-hexyl; branched alkyl groups such as isopropyl, isobutyl, sec-butyl, t-butyl, isopentyl, isohexyl; and cyclic alkyl groups such as cyclopropyl, cyclopentyl, cyclohexyl. Of these, methyl is preferred.

The halogen atom of R may be a fluorine atom, a chlorine atom, a bromine atom or the like, and a fluorine atom or chlorine atom is preferred and a chlorine atom is more preferred.

The C1-C6 alkylsulfonyl group of R may be a straight or branched C1-C6 alkylsulfonyl group and is preferably a C1-C4 alkylsulfonyl group, more preferably C1-C3 alkylsulfonyl group, and is preferably a straight alkylsulfonyl group. Specific examples thereof include straight alkylsulfonyl groups such as methanesulfonyl (methylsulfonyl), ethanesulfonyl (ethylsulfonyl), n-propanesulfonyl (n-propylsulfonyl), n-butylsulfonyl, n-pentylsulfonyl, and n-hexylsulfonyl; and branched alkylsulfonyl groups such as isopropylsulfonyl and isobutylsulfonyl.

The C1-C6 alkylthio group of R may be a straight or branched C1-C6 alkylthio group and is preferably a C1-C4 alkylthio group, more preferably C1-C3 alkylthio group. A straight C1-C6 alkylthio group is preferred. Specific examples include straight alkylthio groups such as methylthio, ethylthio, n-propylthio, n-butylthio, n-pentylthio, and n-hexylthio; and branched alkylthio groups such as isopropylthio, isobutylthio, t-butylthio, isopentylthio, and isohexylthio.

F in Formula (1) represents a phenyl group; or a 6-membered nitrogen-containing heteroaromatic ring. The 6-membered nitrogen-containing heteroaromatic ring may be a nitrogen-containing heteroaromatic ring group which contains one nitrogen atom. Specific examples thereof include pyridyl.

In the 6-membered nitrogen-containing heteroaromatic ring, the position of the ring bonded to alkylene in which the number thereof is represented by "a" is not particularly limited, and the ring is preferably bonded to the carbon atom adjacent to the nitrogen atom. That is, when F is pyridyl, examples thereof include 2-pyridyl, 3-pyridyl and 4-pyridyl, and 2-pyridyl in which the ring is bonded to the carbon atom adjacent to the nitrogen atom is preferred, assuming that a substitution position of the nitrogen atom is 1-position.

When F in Formula (1) is a phenyl group, for R, a hydrogen atom, a sulfo group, a carboxy group, a C1-C6 alkoxy group, a C1-C6 alkyl group and a halogen atom are preferred, and a hydrogen atom, a sulfo group, a carboxy group, a methoxy group, a methyl group, a fluorine atom, and a chlorine atom are more preferred, and a hydrogen atom, a sulfo group and a carboxy group are even further preferred.

When F (group) in Formula (1) is a 6-membered nitrogen-containing heteroaromatic ring, for R, a hydrogen atom, or a halogen atom is preferred, and a hydrogen atom is particularly preferred.

In Formula (1), the substitution position of R in F (group) is not particularly limited.

When F (group) is a phenyl group, assuming that the position of the group F bonded to "$(CH_2)_a$" is 1-position, the substitution position of R may be 2-, 3-, or 4-position and 4-position is preferred.

In addition, when the group F is a 6-membered nitrogen-containing heteroaromatic ring, preferably pyridyl, assuming that the nitrogen atom of the pyridine ring is 1-position, the bond position of "$(CH_2)_a$" and R is a combination in which $(CH_2)_a$ is 2-position and R is 3-, 4-, 5-, or 6-position, and is preferably a combination in which $(CH_2)_a$ is 2-position and R is 4-position.

In Formula (1), a represents a repeating number of "$(CH_2)$", that is, a length of alkylenes, commonly, an integer of 1 to 6, preferably 1 to 4, more preferably 1 to 3, even more preferably 1 to 2, particularly preferably an integer of 1.

In Formula (1), b, c and a total of b and c are an average. On average, b is equal to or higher than 0.00 and is lower than 3.90, c is equal to or higher than 0.10 and is lower than 4.00, and a total of b and c is equal to or higher than 1.00 and lower than 4.00. The average number of the nitrogen-containing heteroaromatic rings of rings A to D is higher than 0.00 and equal to or lower than 3.00 and the average number of the benzene rings is equal to or higher than 1.00 and is lower than 4.00.

Preferably, in the rings A to D, the number of nitrogen-containing heteroaromatic rings is 0.20 to 2.00, the number of benzene rings is 2.00 to 3.80, b is 0.00 to 3.40, c is 0.40 to 2.00, and a total of b and c is 2.00 to 3.80.

More preferably, in the rings A to D, the number of nitrogen-containing heteroaromatic rings is 0.50 to 1.75, the number of benzene rings is 2.25 to 3.50, b is 0.35 to 3.05, c is 0.45 to 1.90, and a total of b and c is 2.25 to 3.50.

More preferably, in rings A to D, the number of nitrogen-containing heteroaromatic rings is 0.75 to 1.50, and the number of benzene rings is 2.50 to 3.25, b is 0.70 to 2.75, c is 0.50 to 1.80, and a total of b and c is 2.50 to 3.25. As c and b increase, ozone resistance improves, but bronzing readily occurs. Taking into consideration ozone resistance and bronzing, the numbers, b and c are suitably controlled and a ratio allowing balance is thus selected.

In addition, the unsubstituted sulfamoyl group and the substituted sulfamoyl group in which the numbers of substituent groups thereof are represented by b and c, respectively, are substituted on the benzene ring, provided that the rings A to D are benzene rings, and are not substituted in a case where the rings A to D are a 6-membered nitrogen-containing heteroaromatic ring.

In addition, in this specification, b, c and a total of b and c are calculated to two decimal places by rounding off the number from three decimal places.

Of rings A to D, E, X, R, F (group), a, b and c, porphyrazine compounds in which preferred substituents are combined together are more preferred, and porphyrazine compounds in which more preferred substituents are combined together are even more preferred. This also applies to porphyrazine compounds in which even more preferred substituents are combined together or preferred substituents are combined with more preferred substituents are even more preferred.

The porphyrazine compound represented by Formula (1) according to the invention may form a salt with sulfo, carboxy and phosphono or the like present in the molecule. In the formation of a salt, the counter cation preferably forms a salt with the cation of each of an inorganic metal, ammonia (NH3) or an organic base.

Examples of the inorganic metal include alkali metals and alkaline earth metals. Examples of the alkali metals include lithium, sodium, potassium and the like. Examples of alkaline earth metals include calcium, magnesium and the like.

Examples of the organic base include organic amines and examples thereof include C1-C3 alkylamines such as methylamine, ethylamine, and mono, di or tri-C1-C4 alkanolamines such as monoethanolamine, diethanolamine, and triethanolamine.

Preferred examples of salts using the counter cation include, but are not limited to, salts of alkali metals such as sodium, potassium, lithium; salts with mono, di or tri-C1-C4 alkanolamines such as monoethanolamine, diethanolamine, triethanolamine, monoisopropanolamine, diisopropanolamine, and triisopropanolamine, and ammonium salts.

In addition, the salt of the porphyrazine compound of the invention may undergo variation in physical properties such as solubility, or performance (in particular, fastness) of ink when used as an ink, depending on the type of salt thereof. For this reason, the type of salts is suitably selected, depending on the performance of the target ink.

A particularly preferred compound as the porphyrazine compound or a salt thereof represented by Formula (1) is a compound having a combination of (a) to (f).
(a) Preferably, the nitrogen-containing heteroaromatic rings of rings A to D each independently represent a pyridine ring condensed at 2-position and 3-position or 3-position and 4-position, or a pyrazine ring condensed at 2-position and 3-position.
(b) E is preferably a linear C2-C4 alkylene.
(c) X is preferably a sulfoanilino group which may contain, as a substituent group, 1 or 2 types of 0 to 2 substituent groups selected from the group consisting of a sulfo group, a carboxy group, a hydroxy group, a C1-C6 alkoxy group, an amino group, a mono(C1-C4)alkylamino group, a di(C1-C4)alkylamino group, a C1-C3 alkylcarbonylamino group, a nitro group, a halogen atom, a C1-C6 alkylsulfonyl group and an alkylthio group; a carboxyanilino group which may contain, as a substituent group, 1 or 2 types of 0 to 2 substituent groups selected from the group consisting of a sulfo group, a carboxy group, a hydroxy group, and a sulfamoyl group; a phosphonoanilino group; or a sulfonaphthylamino group which may contain, as a substituent group, 1 or 2 types of 0 to 2 substituent groups selected from the group consisting of a sulfo group and a hydroxy group.
(d) R is preferably a hydrogen atom; a sulfo group; a carboxy group; a C1-C6 alkoxy group; a C1-C6 alkyl group; or a halogen atom.
(e) The group, F, is preferably a phenyl group; or a pyridyl group in which R is a hydrogen atom.
(f) a is preferably 1 or 2.

In the porphyrazine compound represented by Formula (1) of the invention, specific examples of rings A to D, E, X, R, and group F, and the numbers of a, b and c are shown in Table 1.

The following examples are provided as representative examples to specifically illustrate the porphyrazine compound of the invention, and the invention is not limited to the examples.

In addition, when the nitrogen-containing heteroaromatic rings of rings A to D are pyridine rings, as described below, structural isomers of the nitrogen atom and the like are present and are obtained as a mixture of isomers during synthesis of the porphyrazine compound. It is difficult to separate these isomers and specify the same by analysis. For this reason, these isomers are used as a mixture. The porphyrazine compound of the invention also contains a mixture thereof. In this specification, when these isomers are dependently represented by a formula without distinguishing the isomers from one another, they are represented by one representative formula for convenience. In addition, the numbers of b and c in Tables are reported to one decimal place by rounding off the number from two decimal places for convenience. In addition, in Table 1, "2,3-pyrido" means a pyridine ring condensed with a porphyrazine ring at 2-position and 3-position, and "benzo" means a benzene ring condensed with a porphyrazine ring, "2-pyridyl" means a pyridyl in which the position bonded to "$(CH_2)_a$" is 2-position, assuming that the nitrogen atom of a pyridine ring is 1-position. In addition, "4-chloro" in R represents a substitution position of R in a case where the position bonded to "$(CH_2)_a$" is 1-position, when the group F is a phenyl group; and represents a substitution position of R in a case where the nitrogen atom of the pyridine ring is 1-position when the group F is pyridyl.

TABLE 1

| No | A | B | C | D | E | F | X | R | a | b | c |
|---|---|---|---|---|---|---|---|---|---|---|---|
| 1 | 2,3-Pyrido | Benzo | Benzo | Benzo | Ethylene | Phenyl | 2,5-Disulfoanilino | H | 1 | 1 | 2 |
| 2 | 2,3-Pyrido | Benzo | Benzo | Benzo | Ethylene | Phenyl | 2,4-Disulfoanilino | H | 1 | 1 | 2 |
| 3 | 2,3-Pyrido | Benzo | Benzo | Benzo | Ethylene | Phenyl | 2-Sulfoanilino | H | 1 | 1 | 2 |
| 4 | 2,3-Pyrido | Benzo | Benzo | Benzo | Ethylene | Phenyl | 3-Sulfoanilino | H | 1 | 1 | 2 |
| 5 | 2,3-Pyrido | Benzo | Benzo | Benzo | Ethylene | Phenyl | 4-Sulfoanilino | H | 1 | 1 | 2 |
| 6 | 2,3-Pyrido | Benzo | Benzo | Benzo | Ethylene | Phenyl | 2,5-Disulfoanilino | H | 2 | 1 | 2 |
| 7 | 2,3-Pyrido | Benzo | Benzo | Benzo | Ethylene | Phenyl | 2,5-Disulfoanilino | H | 3 | 1 | 2 |
| 8 | 2,3-Pyrido | Benzo | Benzo | Benzo | Ethylene | Phenyl | 2,5-Disulfoanilino | H | 4 | 1 | 2 |
| 9 | Benzo | 2,3-Pyrido | 2,3-Pyrido | 2,3-Pyrido | Ethylene | Phenyl | 2,5-Disulfoanilino | H | 1 | 0 | 1 |
| 10 | Benzo | 2,3-Pyrido | 2,3-Pyrido | Benzo | Ethylene | Phenyl | 2,5-Disulfoanilino | H | 1 | 1 | 1 |
| 11 | 2,3-Pyrido | Benzo | Benzo | Benzo | Propylene | Phenyl | 2,5-Disulfoanilino | H | 1 | 2 | 1 |
| 12 | 2,3-Pyrido | Benzo | 2,3-Pyrido | Benzo | Propylene | Phenyl | 2,5-Disulfoanilino | H | 1 | 1 | 1 |
| 13 | 2,3-Pyrido | Benzo | 2,3-Pyrido | 2,3-Pyrido | Propylene | Phenyl | 2,5-Disulfoanilino | H | 1 | 0 | 1 |
| 14 | 2,3-Pyrido | Benzo | Benzo | Benzo | Ethylene | Phenyl | 2-Sulfoanilino | 4-Sulfo | 1 | 1 | 2 |
| 15 | 2,3-Pyrido | Benzo | Benzo | Benzo | Ethylene | Phenyl | 3-Sulfoanilino | 4-Sulfo | 1 | 1 | 2 |

TABLE 1-continued

| No | A | B | C | D | E | F | X | R | a | b | c |
|---|---|---|---|---|---|---|---|---|---|---|---|
| 16 | 2,3-Pyrido | Benzo | Benzo | Benzo | Ethylene | Phenyl | 4-Sulfoanilino | 4-Sulfo | 1 | 1 | 2 |
| 17 | Benzo | 2,3-Pyrido | 2,3-Pyrido | 2,3-Pyrido | Ethylene | Phenyl | 4-Sulfoanilino | 4-Sulfo | 1 | 0 | 1 |

TABLE 2

| No | A | B | C | D | E | F | X | R | a | b | c |
|---|---|---|---|---|---|---|---|---|---|---|---|
| 18 | Benzo | 2,3-Pyrido | 2,3-Pyrido | Benzo | Ethylene | Phenyl | 4-Sulfoanilino | 4-Sulfo | 1 | 1 | 1 |
| 19 | 2,3-Pyrido | Benzo | Benzo | Benzo | Ethylene | Phenyl | 2,5-Disulfoanilino | 4-Sulfo | 1 | 1 | 2 |
| 20 | Benzo | 2,3-Pyrido | 2,3-Pyrido | 2,3-Pyrido | Ethylene | Phenyl | 2,5-Disulfoanilino | 4-Sulfo | 1 | 0 | 1 |
| 21 | Benzo | 2,3-Pyrido | 2,3-Pyrido | Benzo | Ethylene | Phenyl | 2,5-Disulfoanilino | 4-Sulfo | 1 | 1 | 1 |
| 22 | 2,3-pyrido | Benzo | Benzo | Benzo | Ethylene | Phenyl | 2-Sulfoanilino | 4-Carboxy | 1 | 1 | 2 |
| 23 | 2,3-Pyrido | Benzo | Benzo | Benzo | Ethylene | Phenyl | 3-Sulfoanilino | 4-Carboxy | 1 | 1 | 2 |
| 24 | 2,3-Pyrido | Benzo | Benzo | Benzo | Ethylene | Phenyl | 4-Sulfoanilino | 4-Carboxy | 1 | 1 | 2 |
| 25 | 2,3-Pyrido | Benzo | Benzo | Benzo | Ethylene | Phenyl | 2,5-Disulfoanilino | 4-Carboxy | 1 | 1 | 2 |
| 26 | Benzo | 2,3-Pyrido | 2,3-Pyrido | 2,3-Pyrido | Ethylene | Phenyl | 2,5-Disulfoanilino | 4-Carboxy | 1 | 0 | 1 |
| 27 | Benzo | 2,3-Pyrido | 2,3-Pyrido | Benzo | Ethylene | Phenyl | 2,5-Disulfoanilino | 4-Carboxy | 1 | 1 | 1 |
| 28 | Benzo | 2,3-Pyrido | 2,3-Pyrido | 2,3-Pyrido | Ethylene | Phenyl | 4-Sulfoanilino | H | 1 | 0 | 1 |
| 29 | Benzo | 2,3-Pyrido | 2,3-Pyrido | Benzo | Ethylene | Phenyl | 4-Sulfoanilino | H | 1 | 1 | 1 |
| 30 | 2,3-Pyrido | Benzo | Benzo | Benzo | Propylene | Phenyl | 4-Sulfoanilino | H | 1 | 2 | 1 |
| 31 | 2,3-Pyrido | Benzo | 2,3-Pyrido | Benzo | Propylene | Phenyl | 4-Sulfoanilino | H | 1 | 1 | 1 |
| 32 | 2,3-Pyrido | Benzo | 2,3-Pyrido | 2,3-Pyrido | Propylene | Phenyl | 4-Sulfoanilino | H | 1 | 0 | 1 |
| 33 | 2,3-Pyrido | Benzo | Benzo | Benzo | Ethylene | Phenyl | 2,5-Disulfoanilino | 4-Chloro | 1 | 1 | 2 |
| 34 | 2,3-Pyrido | Benzo | Benzo | Benzo | Ethylene | Phenyl | 2,5-Disulfoanilino | 4-Methyl | 1 | 1 | 2 |

TABLE 3

| No | A | B | C | D | E | F | X | R | a | b | c |
|---|---|---|---|---|---|---|---|---|---|---|---|
| 35 | 2,3-Pyrido | Benzo | Benzo | Benzo | Ethylene | Phenyl | 2,5-Disulfoanilino | 4-Methoxy | 1 | 1 | 2 |
| 36 | 2,3-Pyrido | Benzo | Benzo | Benzo | Ethylene | Phenyl | 2,5-Disulfoanilino | 4-Fluoro | 1 | 1 | 2 |
| 37 | 2,3-Pyrido | Benzo | Benzo | Benzo | Ethylene | Phenyl | 2,5-Disulfoanilino | 2-Chloro | 1 | 1 | 2 |
| 38 | 2,3-Pyrido | Benzo | Benzo | Benzo | Ethylene | Phenyl | 2,5-Disulfoanilino | 2-Methyl | 2 | 1 | 2 |
| 39 | 2,3-Pyrido | Benzo | Benzo | Benzo | Ethylene | Phenyl | 2,5-Disulfoanilino | 2-Methoxy | 2 | 1 | 2 |
| 40 | 2,3-Pyrido | Benzo | Benzo | Benzo | Ethylene | Phenyl | 2,5-Disulfoanilino | 2-Methoxy | 2 | 1 | 2 |
| 41 | 2,3-Pyrido | Benzo | Benzo | Benzo | Ethylene | 2-Pridyl | 2,5-Disulfoanilino | H | 1 | 1 | 2 |
| 42 | Benzo | 2,3-Pyrido | 2,3-Pyrido | 2,3-Pyrido | Ethylene | 2-Pyridyl | 2,5-Disulfoanilino | H | 1 | 0 | 1 |
| 43 | Benzo | 2,3-Pyrido | 2,3-Pyrido | Benzo | Ethylene | 2-Pyridyl | 2,5-Disulfoanilino | H | 1 | 1 | 1 |
| 44 | 2,3-Pyrido | Benzo | Benzo | Benzo | Ethylene | Phenyl | 3,6,8-Trisulfo-1-naphthylamino | H | 1 | 1 | 2 |
| 45 | Benzo | 2,3-Pyrido | 2,3-Pyrido | 2,3-Pyrido | Ethylene | Phenyl | 3,6,8-Trisulfo-1-naphthylamino | H | 1 | 0 | 1 |
| 46 | Benzo | 2,3-Pyrido | 2,3-Pyrido | Benzo | Ethylene | Phenyl | 3,6,8-Trisulfo-1-naphthylamino | H | 1 | 1 | 1 |
| 47 | 2,3-Pyrido | Benzo | Benzo | Benzo | Ethylene | Phenyl | 4,8-Disulfo-2-naphthylamino | H | 1 | 1 | 2 |
| 48 | 2,3-Pyrido | Benzo | Benzo | Benzo | Ethylene | 2-Pyridyl | 3,6-Disulfo-1-naphthylamino | 4-Chloro | 1 | 1 | 2 |
| 49 | 2,3-Pyrido | Benzo | Benzo | Benzo | Ethylene | Phenyl | 3,6-Disulfo-8-hydroxy-1-naphthylamino | H | 1 | 2 | 1 |
| 50 | 2,3-Pyrido | Benzo | Benzo | Benzo | Ethylene | Phenyl | 4-Methoxy-2-sulfoanilino | H | 1 | 2 | 1 |
| 51 | 2,3-Pyrido | Benzo | Benzo | Benzo | Ethylene | Phenyl | 4-Nitro-2-sulfoanilino | H | 1 | 2 | 1 |

TABLE 4

| No | A | B | C | D | E | F | X | R | a | b | c |
|---|---|---|---|---|---|---|---|---|---|---|---|
| 52 | 2,3-Pyrido | Benzo | Benzo | Benzo | Ethylene | Phenyl | 2-Chloro-5-sulfoanilino | H | 1 | 2 | 1 |
| 53 | 2,3-Pyrido | Benzo | Benzo | Benzo | Ethylene | Phenyl | 3-Methyl-6-sulfoanilino | H | 1 | 2 | 1 |
| 54 | 2,3-Pyrido | Benzo | Benzo | Benzo | Ethylene | Phenyl | 2-Carboxy-5-sulfoanilino | H | 1 | 2 | 1 |
| 55 | 2,3-Pyrido | Benzo | Benzo | Benzo | Ethylene | Phenyl | 2,5-Dicarboxyanilino | H | 1 | 2 | 1 |
| 56 | 2,3-Pyrido | Benzo | Benzo | Benzo | Ethylene | Phenyl | 3-Phosphoanilino | H | 1 | 2 | 1 |
| 57 | 2,3-Pyrido | Benzo | Benzo | Benzo | Ethylene | Phenyl | 2-Hydroxy-3-acetylamino-5-sulfoanilino | H | 1 | 2 | 1 |
| 58 | 2,3-Pyrido | Benzo | Benzo | Benzo | Ethylene | 2-Pyridyl | 5,7-Disulfo-2-naphthylamino | H | 1 | 2 | 1 |
| 59 | 2,3-Pyrido | Benzo | Benzo | Benzo | Ethylene | Phenyl | 6,8-Disulfo-2-naphthylamino | H | 1 | 2 | 1 |
| 60 | 2,3-Pyrido | Benzo | Benzo | Benzo | Ethylene | Phenyl | 3-Carboxy-4-hydroxy-5-sulfoanilino | 4-Methoxy | 1 | 2 | 1 |
| 61 | 2,3-Pyrido | Benzo | Benzo | Benzo | Ethylene | 2-Pyridyl | 3-Methyl-6-methoxy-4-sulfoanilino | 4-Sulfo | 1 | 2 | 1 |
| 62 | 2,3-Pyrido | Benzo | Benzo | Benzo | Ethylene | Phenyl | 4-Methylsulfonyl-2-sulfoanilino | H | 1 | 2 | 1 |
| 63 | 2,3-Pyrido | Benzo | Benzo | Benzo | Ethylene | Phenyl | 4-Methylthio-2-sulfoanilino | 2-Methoxy | 1 | 2 | 1 |
| 64 | 2,3-Pyrido | Benzo | Benzo | Benzo | Ethylene | Phenyl | 3-Amino-4-sulfoanilino | 2-Chloro | 1 | 2 | 1 |
| 65 | 2,3-Pyrido | Benzo | Benzo | Benzo | Ethylene | 2-Pridyl | 4-Methylamino-5-sulfoanilino | H | 1 | 2 | 1 |

TABLE 4-continued

| No | A | B | C | D | E | F | X | R | a | b | c |
|---|---|---|---|---|---|---|---|---|---|---|---|
| 66 | 2,3-Pyrido | Benzo | Benzo | Benzo | Ethylene | Phenyl | 4-Dimethylamino-5-sulfoanilino | H | 1 | 2 | 1 |
| 67 | 2,3-Pyrido | Benzo | Benzo | Benzo | Ethylene | Phenyl | 4-Sulfamoyl-2-carboxyanilino | H | 1 | 2 | 1 |

The porphyrazine compound of the invention may be commonly used without combination with other pigments and, in some cases, may be used in combination with a known cyan pigment as long as the effects of the invention are not impaired.

When the porphyrazine compound is used in combination with a known cyan pigment, a triphenyl methane pigment or phthalocyanine pigment to which a C.I. number is applied may be used as the combined pigment, and a phthalocyanine pigment is preferred.

A method for preparing the porphyrazine compound represented by Formula (1) of the invention will be described.

The porphyrazine compound represented by Formula (1) may be obtained by reacting the following porphyrazine compound represented by Formula (3) with the following organic amine represented by Formula (4) in the presence of ammonia.

The following porphyrazine compound represented by Formula (3) may be obtained by synthesizing a compound represented by Formula (5) by a known method or in accordance with the method, followed by chlorosulfonylation.

[Chem. 3]

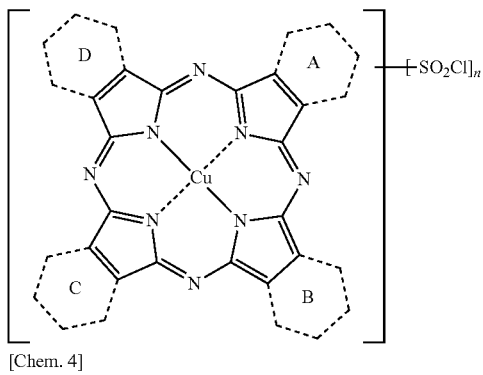

(3)

[Chem. 4]

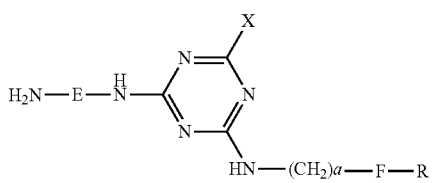

(4)

That is, the compound represented by Formula (5) may be for example synthesized in accordance with the method disclosed in the Pamphlets of International Publication WO 2007/091631 and WO 2007/116933. This known literature does not disclose a method for preparing compounds in which the number of nitrogen-containing heteroaromatic rings in rings A to D is lower than 1. However, compounds represented by Formula (5) in which the number of nitrogen-containing heteroaromatic rings in rings A to D is lower than 1 can be synthesized by changing a mix ratio of a nitrogen-containing heteroaromatic ring dicarbonic acid derivative and a phthalic acid derivative used as reaction materials during synthesis in a known nitrile method or Wyler method.

In addition, the known literature discloses that the obtained compound represented by Formula (5) is a mixture of regioisomers according to the position of nitrogen-containing heteroaromatic ring substituted in rings A to D, and the position of a nitrogen atom substituted in the nitrogen-containing heteroaromatic ring.

[Chem. 5]

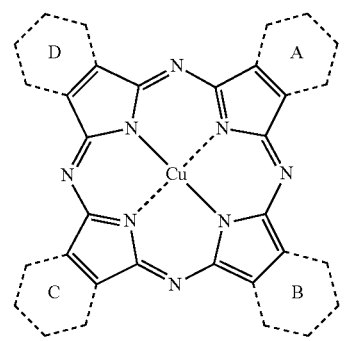

(5)

wherein rings A to D represent the same meaning as in Formula (1).

The porphyrazine compound represented by Formula (3) may be obtained by chlorosulfonylation of the compound represented by Formula (5) in accordance with the same known method disclosed in the Pamphlet of International Publication as in the synthesis of the compound represented by Formula (5). The sulfonyl group in Formula (3) is not incorporated provided that rings A to D incorporated into the benzene ring of rings A to D correspond to nitrogen-containing heteroaromatic rings. Since one chlorosulfonyl group is generally incorporated into the benzene ring, the number of n in Formula (3) is equal to or lower than the number of benzene rings of rings A to D. Accordingly, the number "n" of chlorosulfonyl groups in Formula (3) is equal to or higher than 1.00 and lower than 4.00, which corresponds to the number of benzene rings in the porphyrazine compound represented by Formula (3).

Other synthesis methods of the porphyrazine compound represented by Formula (3) include previous ring-closing condensation of sulfophthalic acid having a sulfo group, quinolinic acid, or the like with a nitrogen-containing heteroaromatic ring dicarbonic acid derivative to synthesize a porphyrazine compound having a sulfo group, then converting the sulfo group into a suitable chlorosulfonyl group using a chlorinating agent such as thionyl chloride. In this case, the substitution position of the sulfo group incorporated into the porphyrazine compound represented by Formula (3) may be controlled by selecting 3-position or 4-position as the substitution position of the sulfo group of the sulfophthalic acid as a synthesis material. That is, when 3-sulfophthalic acid is used, a sulfo group may be incorporated into "α" in Formula (4), and when 4-sulfophthalic acid is used, a sulfo group may be incorporated into "β" in Formula (4). In addition, the term "α-position of porphyrazine ring" or "β-position of porphyrazine ring" means a position corresponding to Formula (6), unless specifically mentioned in the specification.

[Chem. 6]

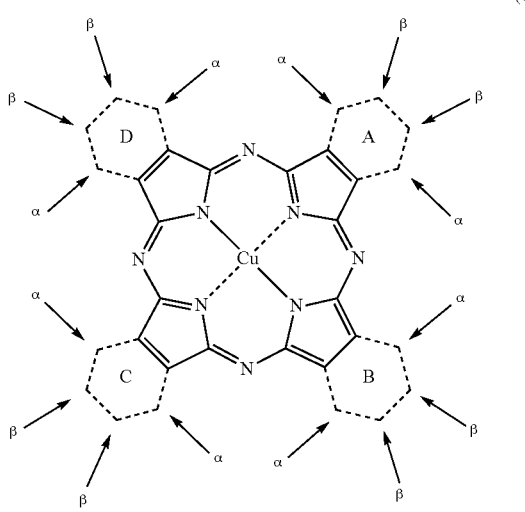

(6)

Meanwhile, the organic amine represented by Formula (4) may be prepared by a known method.

For example, 0.9 to 1.2 moles of substituted aniline or substituted naphthylamine corresponding to X reacts with 1 mole of 2,4,6-trichloro-S-triazine (cyanuric chloride) at 0 to 40° C. for 2 to 12 hours, while adjusting the pH of the reaction solution to about 1 to 5 using a hydroxide of an alkali metal such as sodium hydroxide, to obtain a primary condensate. Subsequently, 0.9 to 1.5 moles of amine "$H_2N$—$(CH_2)_a$—F—R" is added to the reaction solution, followed by reacting at 5 to 80° C., for 0.5 to 12 hours, while adjusting the pH of the reaction solution to about 5 to 10 using a hydroxide of an alkali metal such as sodium hydroxide, to obtain a secondary condensate. One mole of the secondary condensate thus obtained reacts with 1 to 50 moles of alkylenediamine ("$H_2N$-E-$NH_2$", amine) corresponding to E at pH 9 to 12 and at 5 to 90° C. for 0.5 to 8 hours, to obtain an organic amine represented by Formula (4). Hydroxide of an alkali metal such as sodium hydroxide or potassium hydroxide; or carbonate of an alkali metal such as sodium carbonate or potassium carbonate is commonly used for pH adjustment of each condensation reaction. In addition, the order of condensation may be suitably selected depending on the reactivity of compounds condensed with cyanuric chloride and is not limited to the order described above.

The reaction of the porphyrazine compound represented by Formula (3) with the organic amine represented by Formula (4) is carried out in the presence of ammonia in an aqueous solvent at about pH 8 to 10 and at 5 to 70° C. for 1 to 20 hours, to obtain the target porphyrazine compound of the invention represented by Formula (1). The "ammonia" used for the reaction means general ammonia water. However, any chemical may be used as long as it generates ammonia through neutralization or decomposition. Examples of chemicals generating ammonia include, but are not limited to, chemicals generating ammonia through neutralization including ammonium salts such as ammonium chloride and ammonium sulfate; and chemicals generating ammonia through thermal decomposition such as urea; ammonia gas and the like. The "ammonia" is preferably ammonia water and may be commercially available as concentrated ammonia water (commonly commercially available as about 28% ammonia water), or a dilution of the ammonia water with water, as necessary.

The amount of organic amine represented by Formula (4) used is commonly equal to or higher than 1 mole of the theoretical value [the number of calculated moles of organic amine represented by Formula (4) required for obtaining the value C in the target porphyrazine compound represented by Formula (1)] with respect to 1 mole of the porphyrazine compound represented by Formula (3) and is not limited to, since it may be varied depending on the reactivity of organic amine used, and reaction conditions.

1 to 3 moles of the theoretical value are common and about 1 to 2 moles are preferred.

In addition, the porphyrazine compound represented by Formula (1) of the invention is synthesized under reaction conditions no requiring specific anhydrous conditions from the compound represented by Formulae (3) and (4). For this reason, a part of the chlorosulfonyl group in Formula (3) is hydrolyzed by water which coexists in a reaction system and a compound converted into sulfonic acid is further produced as a byproduct. As a result, incorporation of the byproduct into the target porphyrazine compound represented by Formula (1) may be theoretically considered.

However, identification of the unsubstituted sulfamoyl group with the sulfo group is difficult by mass analysis and, the invention discloses that all of the chlorosulfonyl groups represented by Formula (3) which do not react with the organic amine represented by Formula (4) are converted into unsubstituted sulfamoyl groups.

In addition, a part of the porphyrazine compound represented by Formula (1) produces as a by-product, an impurity which forms a copper porphyrazine ring (Pz) or a dimer (for example Pz-L-Pz) or a trimer through a divalent linking group (L) and may be incorporated in the reaction product.

Examples of the divalent linking group represented by L include —$SO_2$—, —$SO_2$—NH—$SO_2$— and the like, and examples of trimers include byproducts in which two L are combined together.

The porphyrazine compound of the invention thus obtained may be separated as a solid through separation by filtration of the solid precipitated by acid precipitation, or salting out or the like from the reaction solution of the final process in the synthetic reaction. The salting out may be for example carried out under an acidic to alkaline range, preferably pH 1 to 11. The temperature in salting out is not particularly limited, but it is preferred to heat typically to 40 to 80° C., preferably 50 to 70° C., and then add a sodium chloride and the like to perform salting out.

The porphyrazine compound of the invention synthesized by the method is obtained as a free acid or a salt thereof. A method for separating the porphyrazine compound as a free acid form is for example acid precipitation. Other methods include salting out, salt formation including converting the resulting salt into free acid and adding a desired organic or inorganic base to the free acid, and a known salt exchange method, when the desired salt cannot be obtained by salting out.

The ink composition of the invention contains at least one aromatic compound having a carboxy group or a salt thereof. As a result, printing matter with superior bronzing resistance can be obtained in spite of beta printing. In addition, the ink composition contains an aromatic lithium salt having a carboxy group, thus inhibiting clogging of the ink composition in the nozzle. That is, cyan ink compositions as well as other color ink compositions such as black ink compositions may be applied to ink compositions with superior bronzing resistance of the invention, as long as the ink compositions contain the porphyrazine compound represented by Formula (1) and contains at least one of an aromatic compound having a carboxy group or a salt thereof. A known other dye may be used together to prepare these various ink compositions.

Any aromatic compound having a carboxy group or a salt thereof may be used for the invention as long as it is an aromatic compound having at least one carboxy group in a molecular structure or a salt thereof. A compound having a carboxy group in a naphthalene skeleton is preferred, a compound having a carboxy group at 2-position in a naphthalene skeleton or a salt thereof is more preferred, and an alkali metal salt of a compound having a carboxy group at 2-position in a naphthalene skeleton or a salt thereof is even more preferred. In addition, a form of the compound having a carboxy group is preferably a lithium salt of the compound, and a lithium salt of a compound having a carboxy group at 2-position in a naphthalene skeleton is thus particularly preferred. In addition, a compound having a carboxy group and an —OR group (R represents a hydrogen atom or a C1 to C6 alkyl group) in a naphthalene skeleton or a salt thereof is preferred, of these, a compound having a carboxy group at 2-position in a naphthalene skeleton, or a salt thereof is more preferred. Specifically, examples of aromatic compounds having a carboxy group or a salt thereof include 1-naphthoic acid, 2-naphthoic acid, 2-hydroxy-1-naphthoic acid, 1-hydroxy-2-naphthoic acid, 3-hydroxy-2-naphthoic acid, 6-hydroxy-2-naphthoic acid, 4-hydroxybenzoic acid, 2,6-naphthalenedicarbonic acid, 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, 6-propoxy-2-naphthoic acid and the like and salts thereof.

The salt of aromatic compound having a carboxy group may be added as a salt and thus be present in the ink. Alternatively, the aromatic compound having a carboxy group and a base may be separately added and the salt may be thus present in the ink.

The content of the aromatic compound having a carboxy group and/or a salt thereof may be determined depending on the type of the aromatic compound having a carboxy group and/or a salt thereof, the type of dye, the type of solvent component and the like. The content is 0.1 to 10% by mass, preferably, 0.5 to 5% by mass, based on the total mass of the ink composition.

It is preferable that the ink composition has a pH (20° C.) of 8.0 or higher in order to stably dissolve predetermined amounts of dye and the aromatic compound having a carboxy group and/or a salt thereof. In addition, it is preferable that the ink composition has a pH (20° C.) of 10.5 or less in terms of anticorrosion of various members which contact the ink composition. It is more preferable that the pH of the ink composition is adjusted to 8.5 to 10.0 to realize optimal balance between these requirements.

The phthalocyanine compound represented by Formula (7) suitable for use in the invention will be described in detail.

[Chem. 7]

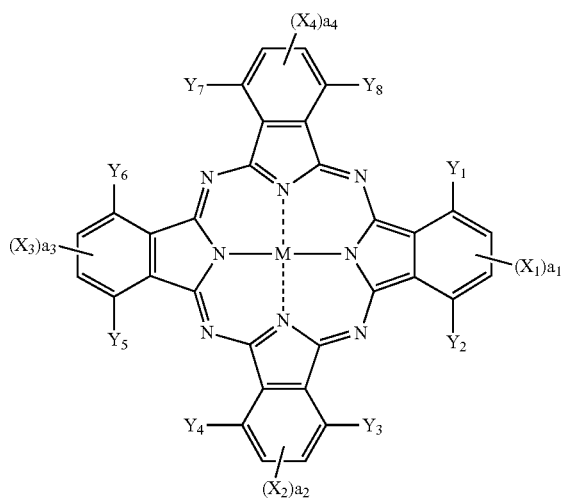

(7)

wherein $X_1$, $X_2$, $X_3$ and $X_4$ each independently represent —SO—Z or —SO$_2$—Z, particularly preferably —SO$_2$—Z.

Each Z independently represents an alkyl group, a cycloalkyl group, an alkenyl group, an aralkyl group, an aryl group, or a heterocyclic group, and particularly, an alkyl group, an aryl group, or a heterocyclic group. Each of Z may further have a substituent group.

Of these, a substituted alkyl group, a substituted aryl group, and a substituted heterocyclic group are preferred, a substituted alkyl group and a substituted aryl group are more preferred, and a substituted alkyl group is most preferred.

The alkyl group represented by Z is preferably an alkyl group having 1 to 30 carbon atoms. The cycloalkyl group represented by Z is preferably a cycloalkyl group having 5 to 30 carbon atoms. The alkenyl group represented by Z is preferably an alkenyl group having 2 to 30 carbon atoms. The aralkyl group represented by Z is preferably an aralkyl group having 7 to 30 carbon atoms. The aryl group represented by Z is preferably an aryl group having 6 to 30 carbon atoms. The heterocyclic group represented by Z is preferably an aromatic heterocyclic group and preferred examples thereof are the same as above and include pyridine, pyrazine, pyrimidine, pyridazine, triazine, pyrazole, imidazole, benzimidazole, triazole, triazole, benzothiazole, isothiazole, benzisothiazole, thiadiazole and the like.

They may have a substituent group and examples of the substituent group include those in a case where the following Z, $Y_1$, $Y_2$, $Y_3$ and $Y_4$ further contain a substituent group.

$Y_1$, $Y_2$, $Y_3$, $Y_4$, $Y_5$, $Y_6$, $Y_7$ and $Y_8$ each independently represent a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryl oxy group, an amide group, an arylamino group, a ureide group, a sulfamoylamino group, an alkylthio group, an arylthio group, an alkoxycarbonyl amino group, a sulfone amide group, a carbamoyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxy group, or a sulfone group and each may further have a substituent group.

Of these, a hydrogen atom, a halogen atom, an alkyl group, an aryl group, a cyano group, an alkoxy group, an amide group, a ureide group, a sulfone amide group, a carbamoyl group, an alkoxycarbonyl group, a carboxy group, and a sulfone group are preferred, and particularly, a hydrogen atom, a halogen atom, a cyano group, a carboxy group and a sulfone group are preferred, and a hydrogen atom is most preferred.

A substituent group which may be included in $Y_1$, $Y_2$, $Y_3$, $Y_4$, $Y_5$, $Y_6$, $Y_7$, $Y_8$ and Z is not particularly limited and examples thereof include a hydroxy group, an alkoxy group, a sulfamoyl group, a sulfone amide group, an acyl amino group, a carbamoyl group, a cyano group and an ionic hydrophilic group (for example, a carboxy group, a sulfone group, a tertiary ammonium group, a sulfonylsulfamoyl group and an acylsulfamoyl group) are preferred, and of these, a hydroxy group, a sulfamoyl group, and an ionic hydrophilic group are particularly preferred.

$a_1$ to $a_4$ satisfy $4 \leq a_1+a_2+a_3+a_4 \leq 8$, preferably $4 \leq a_1+a_2+a_3+a_4 \leq 6$ and each independently represent an integer of 1 or 2. $a_1=a_2=a_3=a_4=1$ is particularly preferred.

M represents a hydrogen atom, a metal element, a metal oxide, a metal hydroxide, or a metal halide.

Preferred examples of M include in addition to a hydrogen atom, metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like. Preferred examples of oxides include VO, GeO and the like. In addition, preferred examples of hydroxides include Si $(OH)_2$, $Cr(OH)_2$, $Sn(OH)_2$ and the like. In addition, preferred examples of halide include $AlCl$, $SiCl_2$, $VCl$, $VCl_2$, $VOCl$, $FeCl$, $GaCl$, $ZrCl$ and the like. Of these, Cu, Ni, Zn, Al and the like are preferred and Cu is most preferred.

In addition, in the phthalocyanine compound represented by Formula (7), Pc (phthalocyanine ring) may form a dimer (for example, Pc-M-L-M-Pc) or a trimer through L (divalent linking group) and plural M may the same or different.

Preferred examples of the divalent linking group represented by L include —O— (oxy group), —S— (thio group), —CO— (carbonyl group), —SO$_2$— (sulfonyl group), —NH— (imino group), —CH$_2$— (methylene group), and combinations thereof.

At least one of $X_1, X_2, X_3, X_4, Y_1, Y_2, Y_3, Y_4, Y_5, Y_6, Y_7$ and $Y_8$ may have an ionic hydrophilic group or an ionic hydrophilic group as a substituent group.

Examples of the ionic hydrophilic group as a substituent group include a sulfone group (—SO$_3^-$X$^+$), a carboxy group (—CO$_2^-$X$^+$), and a quaternary ammonium group (—N$^+$RR'R"X$^-$), an acylsulfamoyl group (—SO$_2$N$^+$X$^-$COR), a sulfonylcarbamoyl group (—CON$^+$X$^-$SO$_2$R), a sulfonylsulfamoyl group (—SO$_2$N$^+$X$^-$SO$_2$R) and the like. A sulfone group, a carboxy group and a quaternary ammonium group are preferred, and a sulfone group is particularly preferred. A sulfone group, a carboxy group, an acylsulfamoyl group, a sulfonylcarbamoyl group and a sulfonylsulfamoyl group may be present as a salt and examples of pairing ions to form the salt include alkali metal ions (for example, sodium ions, potassium ions, lithium ions), ammonium ions, organic cations (for example, tetramethyl guanidinium ions), organic and/or inorganic anions (for example, halogen ions, methanesulfonic ions, benzenesulfonic ions). In addition, X in brackets represents a hydrogen atom or a pairing ion, R, R' and R" represent a substituent group.

The phthalocyanine compound represented by Formula (7) contains at least one of an ionic hydrophilic group or an ionic hydrophilic group as a substituent group in one molecule, thus exhibiting superior solubility or dispersibility in an aqueous medium. In this regard, the phthalocyanine compound represented by Formula (7) preferably contains at least two ionic hydrophilic groups in one molecule, the phthalocyanine compound in which at least one of plural ionic hydrophilic groups is a sulfone group is more preferred and, of these, the phthalocyanine compound in which at least two sulfone groups are contained in one molecule is most preferred.

In Formula (7), the molecular weight of the phthalocyanine compound is preferably 750 to 3000, more preferably, 995 to 2500, even more preferably, 995 to 2000, particularly preferably, 995 to 1800.

When, in the phthalocyanine compound represented by Formula (7) of the invention, Pc (phthalocyanine ring) forms a dimer (for example, Pc-M-L-M-Pc) or a trimer through L (divalent linking group), the molecular weight thereof is preferably, for example, particularly preferably, 2 times (in the case of a dimer), or 3 times (in the case of a trimer) of the preferred molecular weight (995 to 1,800) described above. Here, the molecular weight of the dimer or trimer includes the molecular weight of the linking group L.

A particularly preferred compound as the phthalocyanine compound represented by Formula (7) is a compound having a combination of (a) to (f) below.

(a) $X_1$ to $X_4$ each independently preferably represent —SO$_2$—Z.

(b) Each Z independently preferably represents a substituted alkyl group, a substituted aryl group, a substituted heterocyclic group, and most preferably, a substituted alkyl group.

(c) $Y_1$ to $Y_8$ each independently preferably represent a hydrogen atom, a halogen atom, a cyano group, a carboxy group, and a sulfone group, and most preferably a hydrogen atom.

(d) $a_1$ to $a_4$ each independently preferably represent 1 or 2, particularly preferably $a_1=a_2=a_3=a_4=1$.

(e) M preferably represents Cu, Ni, Zn, or Al, and most preferably Cu, among these.

(f) The molecular weight of the phthalocyanine compound is preferably 750 to 2,500, more preferably 995 to 2,500, even more preferably, 995 to 2,000, particularly preferably 995 to 1,800.

Regarding a combination of preferred substituent groups of the compound represented by Formula (7), a compound in which at least one of various substituent groups is the preferred group is preferred and a compound in which more of various substituent groups are the preferred group is more preferred, and a compound in which all substituent groups are the preferred group is most preferred.

As the compound represented by Formula (7) used for the invention, a compound represented by Formula (2) below is particularly preferred.

[Chem. 8]

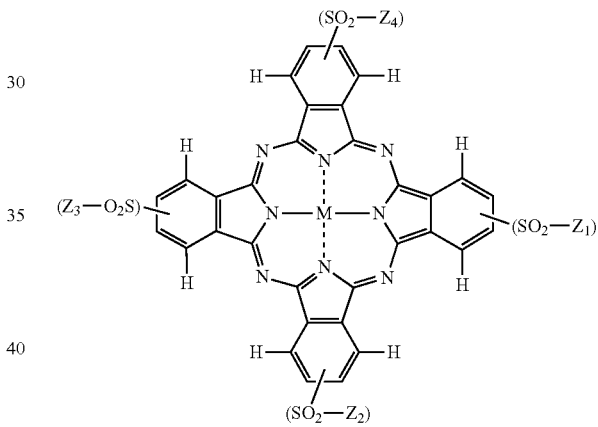

(2)

wherein M and $Z_1$ to $Z_4$ and preferred examples thereof are the same as Z in Formula (7), except that at least one of four Z contains an ionic hydrophilic group as a substituent group.

Of the compounds, a compound of Formula (2) in which M is Cu, and $Z_1$ to $Z_4$ having an ionic hydrophilic group as a substituent group are a sulfoalkyl group is more preferred and a compound in which a sulfone group is present as a salt and a pairing cation to form the salt is a lithium cation is preferred.

The phthalocyanine compound represented by Formula (2) which may be used for the invention is for example synthesized by reacting a phthalonitrile compound represented by the following Formula (8) and/or a diiminoisoindoline derivative represented by the following Formula (9), and a metal derivative represented by M-(Y)d. Specific examples of the metal derivative include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetyl acetone, manganese chloride, manganese acetate, lead chloride, lead acetate, indium chloride, titanium chloride, tin chloride and the like.

[Chem. 9]

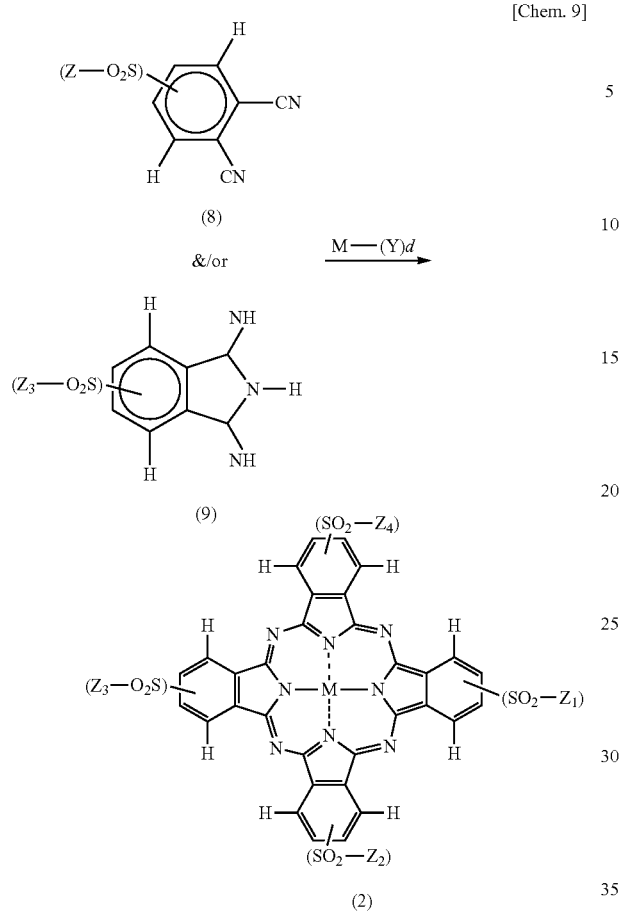

(8)

&/or (9)

$$\xrightarrow{M-(Y)d}$$

(2)

The compound represented by Formula (2) above thus obtained is commonly present as a mixture of compounds represented by Formulae (2-1) to (2-4) below, as isomers in which incorporation positions of $R_1$ ($SO_2$—$Z_1$), $R_2$ ($SO_2$—$Z_2$), $R_3$ ($SO_2$—$Z_3$) and $R_4$ ($SO_2$—$Z_4$) are different.

When a dye is prepared using Formula (8) and/or Formula (9) having different two or more types of substituent groups, the compound represented by Formula (2) is a dye mixture having different types and positions of substituent groups.

[Chem. 10]

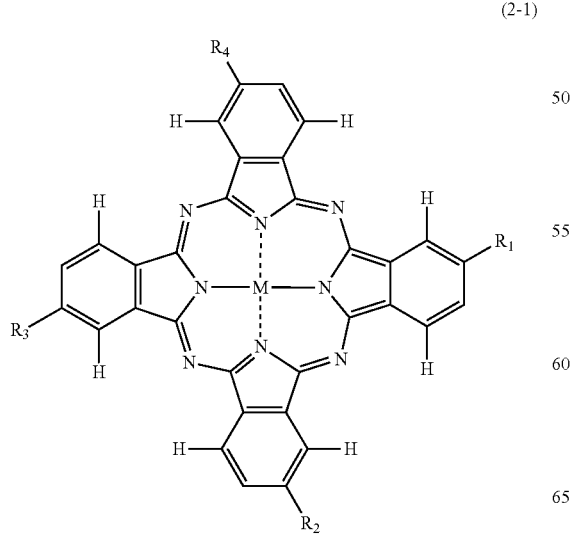

(2-1)

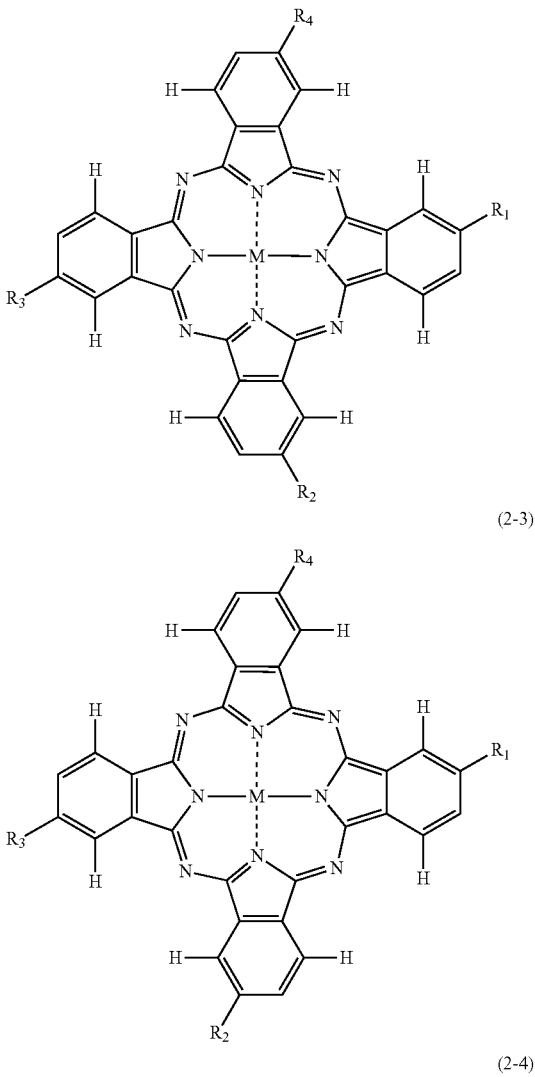

(2-2)

(2-3)

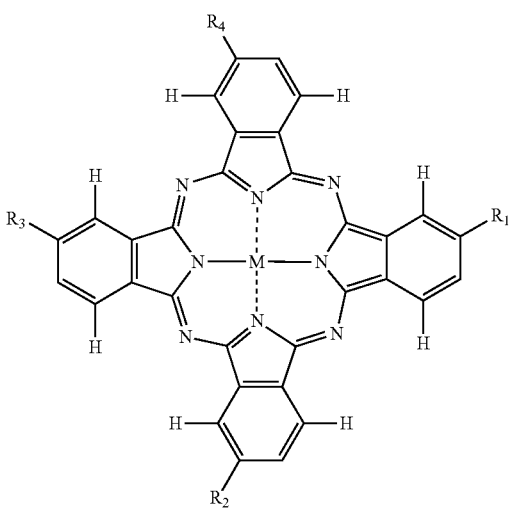

(2-4)

Examples of cyan dyes used for the invention include compounds having the corresponding structures described in JP-A-2002-249677, JP-A-2003-213167, JPA-2003-213168, and JP-A-2004-2670 and particularly preferred examples are shown in the following table. The compounds shown in Table 5 may be synthesized by the method described in the Patent Documents. Starting compounds, pigment intermediates and synthesis methods are not limited to those described therein.

When the content of the solvent is 0.5% by mass or more, improvement of solubility of the coloring material of the invention can be improved. When the content is 10% by mass or less, deterioration in material resistance of a variety of members which contacts the ink composition can be avoided.

TABLE 5

In Formula (2) above

|  | M | $Z_1$ | $Z_2$ | $Z_3$ | $Z_4$ |
|---|---|---|---|---|---|
| Compound A | Cu | —$(CH_2)_3SO_3Na$ | —$(CH_2)_3SO_3Na$ | —$(CH_2)_3SO_3Na$ | —$(CH_2)_3SO_3Na$ |
| Compound B | Cu | —$(CH_2)_3SO_3Li$ | —$(CH_2)_3SO_3Li$ | —$(CH_2)_3SO_3Li$ | —$(CH_2)_3SO_3Li$ |
| Compound C | Cu | —$(CH_2)_3CO_2K$ | —$(CH_2)_3CO_2K$ | —$(CH_2)_3CO_2K$ | —$(CH_2)_3CO_2K$ |
| Compound D | Cu | —$CH_2CH(OH)CH_2SO_3Li$ | —$CH_2CH(OH)CH_2SO_3Li$ | —$CH_2CH(OH)CH_2SO_3Li$ | —$CH_2CH(OH)CH_2SO_3Li$ |
| Compound E | Cu | —$(CH_2)_2CH(CH_3)SO_3Li$ | —$(CH_2)_2CH(CH_3)SO_3Li$ | —$(CH_2)_2CH(CH_3)SO_3Li$ | —$(CH_2)_2CH(CH_3)SO_3Li$ |
| Compound F | Cu | —$(CH_2)_3SO_3Li$ | —$(CH_2)_3SO_3Li$ | —$(CH_2)_3SO_3Li$ | —$(CH_2)_3SO_2NH\,CH_2CH(OH)CH_3$ |
| Compound G | Cu | —$(CH_2)_3SO_3Li$ | —$(CH_2)_3SO_3Li$ | —$(CH_2)_3SO_2NHCH_2CH(OH)CH_3$ | —$(CH_2)_3SO_2NHCH_2CH(OH)CH_3$ |
| Compound H | Cu | —$(CH_2)_3SO_3Li$ | —$(CH_2)_3SO_3Li$ | —$(CH_2)_3SO_3Li$ | —$(CH_2)_3SO_2NHCH(CH_3)CH_2OH$ |
| Compound I | Cu | —$(CH_2)_3SO_3Li$ | —$(CH_2)_3SO_3Li$ | —$(CH_2)_3SO_2NHCH(CH_3)CH_2OH$ | —$(CH_2)_3SO_2NHCH(CH_3)CH_2OH$ |
| Compound J | Cu | —$(CH_2)_3SO_3Li$ | —$(CH_2)_3SO_3Li$ | —$(CH_2)_3SO_3Li$ | —$(CH_2)_3SO_2N(C_2H_4OH)_2$ |
| Compound K | Cu | —$(CH_2)_3SO_3Li$ | —$(CH_2)_3SO_3Li$ | —$(CH_2)_3SO_3Li$ | —$(CH_2)_5CO_2Li$ |

The content of dye may be determined depending on the type of compound represented by Formula (7) and the type of solvent component and the like. The content is preferably 0.1 to 10% by mass, even more preferably 0.5 to 5% by mass, with respect to the total mass of the ink composition. When the content is 0.1% by mass or more, a coloring property or image density on a recording medium can be secured. When the content is 10% by mass or less, it is easy to adjust viscosity of the ink composition, and thus to easily secure properties such as ejection reliability or an anti-clogging property.

The ink composition of the invention may further contain a humectant selected from water-soluble organic solvents having a lower vapor pressure than pure water and/or saccharides. The ink composition containing humectants inhibits evaporation of moisture in the ink jet recording method and imparts moisture to the ink. In addition, the water-soluble organic solvent can improve ejection stability or allow easy viscosity adjustment without varying ink characteristics. The water-soluble organic solvent is a medium capable of dissolving a solute, which is selected from organic water-soluble solvents having a lower vapor pressure than water. Specifically, examples thereof include polyvalent alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol and dipropylene glycol, ketones such as acetonyl acetone, γ-butyrolactone, esters such as triethyl phosphate, furfuryl alcohol, tetrahydrofurfuryl alcohol, thiodiglycol and the like. In addition, preferred examples of saccharides include maltitol, sorbitol, gluconolactone maltose and the like. The humectant is preferably present in an amount of 5 to 50% by mass, more preferably, 5 to 30% by mass, more preferably, 5 to 20% by mass, based on the total amount of the ink composition. When the content of the humectant is 5% by mass or more, moisturization can be obtained. In addition, when the content of the humectant is 50% by mass or less, it is easy to adjust viscosity to a level useful for ink jet recording.

In addition, the ink composition of the invention preferably contains a nitrogen-containing organic solvent as a solvent. Examples of the nitrogen-containing organic solvent include 1,3-dimethyl-2-imidazolidinone, 2-pyrrolidone, N-methyl-2-pyrrolidone, ε-caprolactam and the like. Of these, 2-pyrrolidone may be suitably used. The solvent may be used alone or in combination thereof. The content of the solvent is preferably 0.5 to 10% by mass, more preferably, 1 to 5% by mass.

In addition, the ink composition of the invention preferably contains a nonionic surfactant as an additive which is effective in obtaining rapid permeability of ink and maintaining roundness of one dot.

Examples of the nonionic surfactant used for the invention include acetylene glycol surfactants. Specific examples of the acetylene glycol surfactant include 2,4,7,9-tetramethyl-5-decyne-4,7-diol, 3,6-dimethyl-4-octyn-3,6-diol, 3,5-dimethyl-1-hexyn-3-ol, 2,4-dimethyl-5-hexyn-3-ol and the like. In addition, examples of useful acetylene glycol surfactants include commercially available products such as Surfynol 465 (registered trademark), Surfynol 104, Olfine STG (registered trademark) (all, manufactured by Nissin Chemical Industry Co., Ltd., trade name). The content of the acetylene glycol surfactant is 0.1 to 5% by mass, preferably 0.5 to 2% by mass. When the content is 0.1% by mass or more, sufficient permeability can be obtained. When the content is 5% by mass or less, it is easy to prevent bleeding of images.

In addition to the nonionic surfactant, when glycol ether as a permeation accelerator is added to the ink composition, permeability is further increased, bleeding with the adjacent color ink during color printing is reduced, and considerable clear images can be thus obtained.

Examples of glycol ether used for the invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, triethylene glycol monobutyl ether and the like. The content of the glycol ester is 3 to 30% by mass, preferably 5 to 15% by mass. When the content is lower than 3% by mass, the effect of bleeding prevention cannot be obtained. In addition, when the content is higher than 30% by mass, bleeding of images and separation of an oil phase occur. A dissolution aid of glycol ether is required and ink viscosity is thus increased, and ejection from an ink jet head is difficult.

The ink composition of the invention may optionally further contain pH adjusters such as triethanolamine or hydroxide of an alkali metal, hydrotropic agents such as urea and derivatives thereof, water-soluble polymers such as sodium alginate, water-soluble resins, fluorine surfactants, mold-inhibiting agents, corrosion inhibitors and the like.

For example, the ink composition of the invention may be prepared by sufficiently mixing and dissolving respective components, filtering the solution using a membrane filter with a hole diameter of 0.8 μm under pressure and degassing the resulting product using a vacuum pump.

Next, a recording method using the ink composition of the invention will be described. The recording method of the invention may be applied to an ink jet recording method in which an ink composition is ejected in the form of droplets from a nozzle, and the droplets are adhered to a recording medium to perform recording as well as general writing equipment, recording meters, pen plotters and the like.

The ink jet recording method may be any of methods known in the related art and, in particular, may be a superior image recording method such as a method for ejecting liquid droplets using a piezo-electric element (method for forming liquid droplets using mechanical deformation of a piezo-electric element) or a method using thermal energy (a method for forming liquid droplets by foam generated by heating an ink).

EXAMPLE

Hereinafter, the invention will be described in detail with reference to Examples and Comparative Examples of the invention. In addition, the invention is not limited to the following Examples.

As a representative example of the porphyrazine compound represented by Formula (1) used for Examples of the invention, a method for synthesizing a coloring material A, a coloring material B and a coloring material C is described. The "part" and "%" in the specification is based on weight, unless specifically described. In addition, operation of reaction, crystallization or the like is performed under stirring, unless specifically described. In addition, "trade name LEOCOL (registered trademark) TD-90 and TD-50" are surfactants (all manufactured by Lion Corporation) used for synthesis reaction. In addition, when a required amount of the target compound could not be obtained with a single synthesis reaction, the same reaction was repeated until the required amount was obtained.

In addition, the porphyrazine compound of the invention synthesized in Preparation Example is a mixture including isomers as described above and a yield thereof also includes isomers or the like. In addition, unless specifically described, the substitution position of the unsubstituted and substituted sulfamoyl group in the porphyrazine compound of the invention is a combination of those substituted at α-position and β-position of a porphyrazine ring.

In addition, the maximum absorbance wavelength (λmax) of the porphyrazine compound of the invention obtained in Preparation Example was measured in a pH 7 to 9 aqueous solution. At this time, the adjustment of pH was performed using an aqueous sodium hydroxide solution.

Preparation Example 1

Process 1

Synthesis of compound of Formula (5) above in which 1.20 of rings A to D is a pyridine ring condensed at 2-position and 3-position, and the remaining (2.80) thereof is a benzene ring.

31.11 parts of anhydrous phthalic acid, 15.04 parts of quinolinic acid, 108 parts of urea, 10.1 parts of copper chloride (II) and 1.5 parts of ammonium molybdate were added to 375 parts of sulfolane, the temperature was elevated to 200° C., followed by reaction at this temperature for 5 hours. After the reaction was completed, the reaction solution was cooled to 65° C., 50 parts of DMF (N,N-dimethylformamide) was added thereto, and the precipitated solid was separated by filtration. The resulting solid was washed with 50 parts of DMF to obtain 75.1 parts of a wet cake. The resulting wet cake was added to 450 parts of DMF, and the humidity was elevated at 110° C., followed by reacting at the same temperature for one hour. The precipitated solid was separated by filtration and washed with 200 parts of water to obtain a wet cake. The resulting wet cake was added to 450 parts of 5% hydrochloric acid, the temperature was elevated to 60° C., followed by stirring at the same temperature for one hour. The precipitated solid was separated by filtration and washed with 200 parts of water to obtain a wet cake. The resulting wet cake was added to 450 parts of 5% ammonia water, followed by stirring at 60° C. for one hour. The precipitated solid was separated by filtration and washed with 200 parts of water to obtain 78.6 parts of a wet cake. The resulting wet cake was dried at 80° C. to obtain the target compound as 24.9 parts of a blue solid.

Process 2

Synthesis of compound of Formula (3) above in which 1.20 of rings A to D is a pyridine ring condensed at 2-position and 3-position, the remaining (2.80) thereof is a benzene ring and n is 2.80.

At room temperature, 5.8 parts of the compound of Formula (5) obtained in Example 1 (Process 1) was slowly added to 46.2 parts of chlorosulfonic acid such that the temperature did not exceed 60° C., followed by reacting at 140° C. for 4 hours. The resulting reaction solution was cooled to 70° C., 17.9 parts of thionyl chloride was added dropwise for 30 minutes, followed by further reacting at 70° C. for 3 hours. The reaction solution was cooled to 30° C. or lower and slowly poured into 800 parts of ice water, and the precipitated solid was separated by filtration and washed with 200 parts of cool water to obtain 38.2 parts of a wet cake of the target compound.

Process 3

Synthesis of organic amine represented by Formula (10) below.

[Chem. 11]

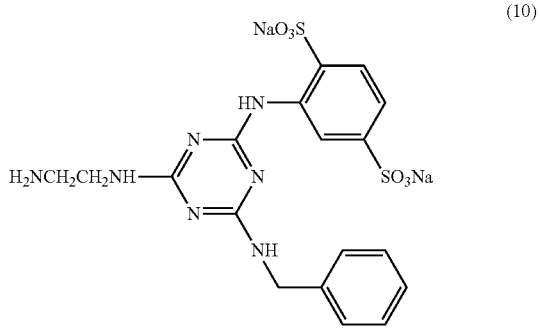

(10)

18.4 parts of cyanuric chloride and 0.05 parts of LEOCOL TD-90 (trade name) were added to 100 parts of ice water, followed by stirring at 10° C. or lower for 30 minutes. Then, 31.7 parts of 2,5-disulfoaniline (commercially available product with a purity of 88.4%) was added to the reaction solution, the pH of the reaction solution was adjusted to 2.0 to 3.0 using a 10% aqueous sodium hydroxide solution, followed by reacting at 0 to 10° C. for 2 hours and then at 25 to 30° C. for one hour. Then, 10.9 parts of benzylamine was added to the reaction solution, and pH of the reaction solution was adjusted to 7.0 to 8.0 using a 10% aqueous sodium hydroxide solution, followed by reacting at 25 to 30° C. for one hour and then at 30 to 40° C. for one hour, to obtain a reaction solution containing a secondary condensate.

The reaction solution containing the secondary condensate thus obtained was slowly added to an aqueous solution of 60.1 parts of ethylenediamine in 120 parts of ice, followed by stirring at room temperature for one hour. 150 parts of ice was added to this solution and 200 parts of concentrated hydrochloric acid was added to adjust the pH of the solution to 1.0. At this time, an amount of the solution was 700 parts. 140 parts of sodium chloride was added to this reaction solution, followed by stirring for one night to precipitate a solid. The precipitated solid was separated by filtration to obtain 70.0 parts of a wet cake. The resulting wet cake was added to 280 parts of water, and the pH was adjusted to 9.0 with a 10% aqueous sodium hydroxide solution, followed by dissolution. At this time, an amount of the solution was 360 parts. The pH of this solution was adjusted to 1.0 with concentrated hydrochloric acid, and 70 parts of sodium chloride was added thereto, followed by stirring for one night to precipitate a solid. The precipitated solid was separated by filtration to obtain 60.3 parts of a wet cake. The resulting wet cake was added to a mixed solvent of 255 parts of methanol and 45 parts of water, followed by stirring at 50° C. for one hour. The precipitated solid was separated by filtration to obtain 50.3 parts of a wet cake. The resulting wet cake was dried to obtain 15.3 parts of the target organic amine represented by Formula (10) as a white powder.

Process 4

Synthesis of the porphyrazine compound of the invention represented by Formula (11) below [Synthesis of coloring material A of Formula (11) below in which 1.20 of rings A to D is a pyridine ring condensed at 2-position and 3-position, and the remaining (2.80) thereof is a benzene ring].

to this suspension, followed by reacting while maintaining at pH 9.0 using 28% ammonia water. While maintaining the pH, the temperature was elevated to 20° C., followed by reacting at the same temperature for one night.

At this time, the solution amount was 300 parts. The reaction solution was heated to 50° C., and 55.0 parts of sodium chloride was added thereto, followed by stirring for 10 minutes. The pH of the reaction solution was adjusted to 1.0 with concentrated hydrochloric acid, and the precipitated solid was separated by filtration and washed with 100 parts of a 20% aqueous sodium chloride solution to obtain 27.1 parts of a wet cake. The resulting wet cake was added to 191 parts of water and the pH was adjusted to 9.0 with a 25% aqueous sodium hydroxide solution to obtain a solution. At this time, the solution amount was 270 parts. This solution was heated to 50° C., and 54 parts of sodium chloride was added thereto, followed by stirring for 30 minutes. The pH was adjusted to 4.0 with concentrated hydrochloric acid, and the precipitated solid was separated by filtration and washed with 100 parts of a 20% aqueous sodium chloride solution to obtain 21.4 parts of a wet cake. The resulting wet cake was added to a mixed solution of 160 parts of isopropyl alcohol and 40 parts of water, followed by stirring at 50° C. for one hour. The precipitated solid was separated by filtration to obtain 15.7 parts of a wet cake. The resulting wet cake was dried to obtain 11.2 parts of a free acid of the porphyrazine compound of the invention represented by Formula (11) as a blue powder. λmax: 605 nm.

Preparation Example 2

Process 1

Synthesis of compound of Formula (5) above in which 1.37 of rings A to D is a pyridine ring condensed at 2-position and 3-position, and the remaining (2.63) thereof is a benzene ring.

29.16 parts of anhydrous phthalic acid, 17.23 parts of quinolinic acid, 108 parts of urea, 10.1 parts of copper (II) chloride and 1.5 parts of ammonium molybdate were added to

[Chem. 12]

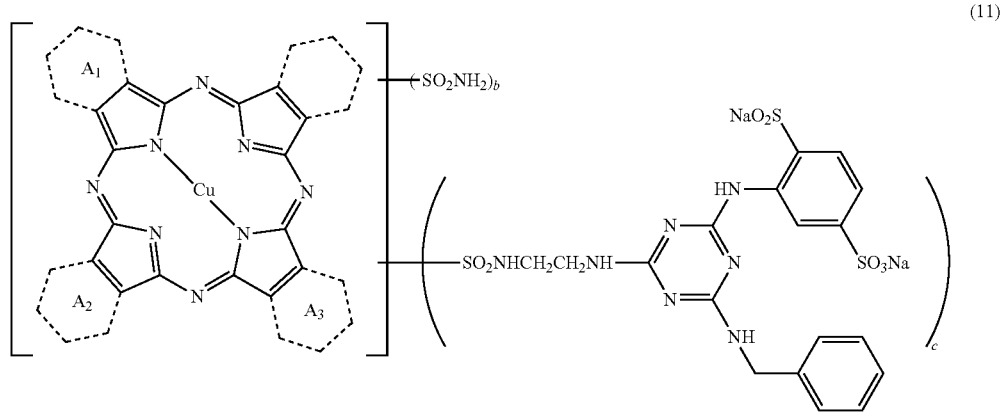

(11)

38.2 parts of the wet cake obtained in Preparation Example 1 (Process 2) was added to 200 parts of ice water, followed by suspending by stirring at 5° C. or lower. After 10 minutes, while maintaining at 10° C. or lower, a solution of 7.4 parts of the organic amine of Formula (10) obtained in Preparation Example 1 (Process 3) dissolved in a mixed solution of 1.5 parts of 28% ammonia water and 40 parts of water was added 375 parts of sulfolane, the temperature was elevated to 200° C., followed by reaction at this temperature for 5 hours. After the reaction was completed, the reaction solution was cooled to 65° C., 50 parts of DMF was added thereto, and the precipitated solid was separated by filtration. The resulting solid was washed with 50 parts of DMF to obtain 75.1 parts of a wet cake. The resulting wet cake was added to 450 parts of DMF, and the humidity was elevated at 110° C., followed by reacting at the same temperature for one hour. The precipitated solid was separated by filtration and washed with 200 parts of water to obtain a wet cake. The resulting wet cake was added to 450 parts of 5% hydrochloric acid, the temperature was elevated to 60° C., followed by stirring at the same temperature for one hour. The precipitated solid was separated by filtration and washed with 200 parts of water to obtain a wet cake. The resulting wet cake was added to 450 parts of 5% ammonia water, followed by stirring at 60° C. for one hour. The precipitated solid was separated by filtration and washed with 200 parts of water to obtain 78.6 parts of a wet cake. The resulting wet cake was dried at 80° C. to obtain the target compound as 23.1 parts of a blue solid.

Process 2

Synthesis of compound of Formula (3) above in which 1.37 of rings A to D is a pyridine ring condensed at 2-position and 3-position, the remaining (2.63) thereof is a benzene ring and n is 2.63.

At room temperature, 5.8 parts of the compound of Formula (5) obtained in Preparation Example 2 (Process 1) was slowly added to 46.2 parts of chlorosulfonic acid such that the temperature did not exceed 60° C., followed by reacting at 140° C. for 4 hours. The resulting reaction solution was cooled to 70° C., 17.9 parts of thionyl chloride was added dropwise for 30 minutes, followed by further reacting at 70° C. for 3 hours. The reaction solution was cooled to 30° C. or lower and slowly poured into 800 parts of ice water, and the precipitated solid was separated by filtration and washed with 200 parts of cool water to obtain 33.0 parts of a wet cake of the target compound.

Process 3

Synthesis of Organic Amine Represented by Formula (10) Above

An organic amine represented by Formula (10) was obtained in the same manner as in Preparation Example 1 (Process 3).

Process 4

Synthesis of the porphyrazine compound of the invention represented by Formula (11) below [Synthesis of coloring material B of Formula (11) below in which 1.37 of rings A to D is a pyridine ring condensed at 2-position and 3-position, and the remaining (2.63) thereof is a benzene ring].

33.0 parts of the wet cake obtained in Preparation Example 2 (Process 2) was added to 200 parts of ice water, followed by suspending by stirring at 5° C. or lower. After 10 minutes, while maintaining at 10° C. or lower, a solution of 7.4 parts of the organic amine of Formula (10) obtained in Preparation Example 2 (Process 3) dissolved in a mixed solution of 1 part of 28% ammonia water and 40 parts of water was added to this suspension, followed by reacting while maintaining at pH 9.0 using 28% ammonia water. While maintaining the pH, the temperature was elevated to 20° C., followed by reacting at the same temperature for one night.

At this time, the solution amount was 300 parts. The reaction solution was heated to 50° C., and 55.0 parts of sodium chloride was added thereto, followed by stirring for 10 minutes. The pH of the reaction solution was adjusted to 1.0 with concentrated hydrochloric acid, and the precipitated solid was separated by filtration and washed with 100 parts of a 20% aqueous sodium chloride solution to obtain 31.2 parts of a wet cake. The resulting wet cake was added to 240 parts of water and the pH was adjusted to 9.0 with a 25% aqueous sodium hydroxide solution to obtain a solution. At this time, the solution amount was 280 parts. This solution was heated to 50° C., and 55 parts of sodium chloride was added thereto, followed by stirring for 30 minutes. The pH was adjusted to 1.0 with concentrated hydrochloric acid, and the precipitated solid was separated by filtration and washed with 100 parts of a 20% aqueous sodium chloride solution to obtain 25.1 parts of a wet cake. The resulting wet cake was added to a mixed solution of 40 parts of water and 160 parts of isopropyl alcohol, followed by stirring at 50° C. for one hour. The precipitated solid was separated by filtration to obtain 30.0 parts of a wet cake. The resulting wet cake was dried to obtain 10.4 parts of a free acid of the porphyrazine compound of the invention represented by Formula (11) as a blue powder.

λmax: 604 nm.

Preparation Example 3

Process 1

Synthesis of compound of Formula (5) above in which 1.20 of rings A to D is a pyridine ring condensed at 2-position and 3-position, and the remaining (2.80) thereof is a benzene ring.

The target compound was obtained in the same manner as in Preparation Example 1 (Process 1).

Process 2

Synthesis of compound of Formula (3) above in which 1.20 of rings A to D is a pyridine ring condensed at 2-position and 3-position, the remaining (2.80) thereof is a benzene ring and n is 2.80.

A wet cake of the target compound was obtained in the same manner as in Preparation Example 1 (Process 2).

Process 3

Synthesis of Organic Amine Represented by Formula (10).

An organic amine represented by Formula (10) was obtained in the same manner as in Preparation Example 1 (Process 3).

Process 4

Synthesis of the porphyrazine compound of the invention represented by Formula (11) above [Synthesis of coloring material C of Formula (11) above in which 1.20 of rings A to D is a pyridine ring condensed at 2-position and 3-position, and the remaining (2.80) thereof is a benzene ring.

38.2 parts of the wet cake obtained in Preparation Example 3 (Process 2) was added to 200 parts of ice water, followed by suspending by stirring at 5° C. or lower. After 10 minutes, while maintaining at 10° C. or lower, a solution of 3.7 parts of the organic amine of Formula (10) obtained in Preparation Example 3 (Process 3) dissolved in a mixed solution of 1.5 parts of 28% ammonia water and 40 parts of water was added to this suspension, followed by reacting while maintaining at pH 9.0 using 28% ammonia water. While maintaining the pH, the temperature was elevated to 20° C., followed by reacting at the same temperature for one night.

mix ratio shown in Table 6, dissolved and filtered under pressure through a membrane filter having a pore diameter of 1 μm to prepare respective ink compositions.

TABLE 6

|  |  | Examples | | | | | | | | | | Comparative Examples | | | |
|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 |
| Coloring material | Coloring material A | 4 | 1 |  |  |  |  |  |  |  | 2 | 4 |  |  |  |
|  | Coloring material B |  |  | 4 |  |  |  |  |  |  |  |  |  |  |  |
|  | Coloring material C |  |  |  | 4 | 4 | 4 | 1 | 2 | 2 |  |  |  |  |  |
|  | Coloring material D |  |  |  |  |  |  |  | 2 |  |  |  |  |  |  |
|  | Coloring material E |  |  |  |  |  |  |  |  | 2 |  |  |  |  | 4 |
|  | Coloring material F |  |  |  |  |  |  |  |  |  | 2 |  |  |  |  |
|  | DB199 |  |  |  |  |  |  |  |  |  |  |  | 4 | 4 |  |
| Organic solvent | Glycerin | 10 | 10 | 10 | 10 | 10 | 10 | 8 | 10 | 10 | 10 | 10 | 10 | 10 | 10 |
|  | Triethylene glycol | 3 | 3 | 3 | 3 | 3 | 3 | 5 | 3 | 3 | 3 | 3 | 3 | 3 | 3 |
|  | 2-Pyrrolidone |  |  | 6 |  |  |  | 7 |  |  |  |  |  |  |  |
|  | 1,2-Hexanediol |  |  |  | 5 | 5 | 5 |  |  |  |  |  |  |  |  |
|  | Olfine E1010 (manufactured by Nissin Chemicals Co.) | 1 | 1 | 1 | 1 | 1 | 1 | 1 | 1 | 1 | 1 | 1 | 1 | 1 | 1 |
|  | Olfine PD002W (manufactured by Nissin Chemicals Co.) | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Diethylene glycol monobutyl ether |  |  |  |  |  |  |  |  |  |  |  |  |  |  |
|  | Triethylene glycol monobutyl ether | 10 | 10 | 10 | 5 | 5 | 5 | 7 | 10 | 10 | 10 | 10 | 10 | 10 | 11 |
| Alkali | Triethanolamine | 0.2 | 0.2 | 0.2 | 0.2 | 0.2 | 0.2 | 0.2 | 0.2 | 0.2 | 0.2 | 0.2 | 0.2 | 0.2 | 1.2 |
|  | Sodium hydroxide | 0.9 | 0.5 | 0.9 | 0.9 | 0.9 | 0.9 | 0.5 | 0.9 | 0.9 | 0.9 |  | 0.9 |  | 0.9 |
| Anti-bronzing additive | 2-Naphthoic acid | 4 | 2 | 4 | 4 |  |  | 2 | 4 | 4 | 4 |  | 4 |  | 4 |
|  | 3-Hydroxy-2-naphthoic acid |  |  |  |  | 4 |  |  |  |  |  |  |  |  |  |
|  | 6-Hydroxy-2-naphthoic acid |  |  |  |  |  | 4 |  |  |  |  |  |  |  |  |
| Anti-bronzing additive | Proxel XL-2 (manufactured by Arch chemicals, Japan, inc.) | 0.3 | 0.3 | 0.3 | 0.3 | 0.3 | 0.3 | 0.3 | 0.3 | 0.3 | 0.3 | 0.3 | 0.3 | 0.3 | 0.3 |
|  | Water | Balance | Balance | Balance | Balance | Balance | Balance | Balance | Balance | Balance | Balance | Balance | Balance | Balance | Balance |

Unit: mass %

At this time, the solution amount was 300 parts. The reaction solution was heated to 50° C., and 60 parts of sodium chloride was added thereto, followed by stirring for 30 minutes. The pH of the reaction solution was adjusted to 5.0 with concentrated hydrochloric acid, and the precipitated solid was separated by filtration and washed with 100 parts of a 20% aqueous sodium chloride solution to obtain 24.2 parts of a wet cake. The resulting wet cake was added to 200 parts of water and the pH was adjusted to 9.0 with a 25% aqueous sodium hydroxide solution to obtain a solution. At this time, the solution amount was 250 parts. This solution was heated to 50° C., and 50 parts of sodium chloride was added thereto, followed by stirring for 30 minutes. The pH was adjusted to 4.0 with concentrated hydrochloric acid, and the precipitated solid was separated by filtration and washed with 100 parts of a 20% aqueous sodium chloride solution to obtain 22.3 parts of a wet cake. The resulting wet cake was added to a mixed solution of 160 parts of isopropyl alcohol and 40 parts of water, followed by stirring at 50° C. for one hour. The precipitated solid was separated by filtration to obtain 14.4 parts of a wet cake. The resulting wet cake was dried to obtain 10.8 parts of a free acid of the porphyrazine compound of the invention represented by Formula (11) as a blue powder. λmax: 602 nm.

Examples A1 to A10 and Comparative Examples A1 to A4

The components for the ink compositions of Examples A1 to A10 and Comparative Examples A1 to A4 were mixed at a In addition, respective components of the ink composition shown in Table 6 are represented in % by mass with respect to the total amount of the ink composition and the balance is water. In addition, in the table, A to C are Na salts of porphyrazine compounds of Preparation Examples 1 to 3 and the coloring materials D to F are compounds F to H in Table 5 above.

The ink compositions described in Examples A1 to A10 and Comparative Examples A1 to A4 were added to a cartridge (cyan chamber) for ink compositions, using an ink jet printer, PM-G800 (manufactured by Seiko Epson Corporation) and were printed onto recording media, and the evaluation was performed. The results are shown in Table 7.

Evaluation of Bronzing

Glossiness of printing matters on which beta printing (Duty 100%) at an input of 1.9 mg/in $CH_2$ on photo paper CRISPIA (trade name, manufactured by Seiko Epson Corporation, model number: KA450SCKR) could be performed using the cartridge were measured at a measurement angle of 60 degrees using a gloss meter (PG-1M: manufactured by Nippon Denshoku Industries Co., Ltd.). Here, "duty" is a value calculated by the following equation.

duty(%)=number of actually recorded dots/(height resolution×width resolution)×100

(wherein a number of actually recorded dots represents a number of actually recorded dots in a unit area and "height resolution" and "width resolution" represent a resolution recorded in a unit area.) The printing was carried out under an environment of 25° C. and 40% RH (the value calculated from the resulting glossiness and the following equation was used for evaluation of bronzing).

Value for evaluation of bronzing=glossiness(printing matter)−glossiness(recording medium)

Evaluation Criteria
Grade A: lower than 15
Grade B: equal to or higher than 15 and lower than 35
Grade C: equal to or higher than 35 and lower than 55
Grade D: equal to or higher than 55
Evaluation of Ozone Resistance Printing was performed on photo paper CRISPIA (trade name, manufactured by Seiko Epson Corporation, model number: KA450SCKR) using the cartridge at a duty controlled to adjust optical density (OD) to 1.0, and the resulting printing matter was exposed for a predetermined period (40, 60, 80 hours) under conditions of 24° C., relative humidity 60% RH, and an ozone concentration of 5 ppm using an ozone weather meter OMS-H (trade name, Suga tester (manufactured by Suga Test Instruments Co., Ltd.).

After exposure, the OD of each printing matter was measured using a reflection density meter, Spectrolino (trade name, manufactured by GRETAG MACBETH) and a relative optical density (ROD) was calculated in accordance with the following equation and then evaluated based on the evaluation criteria.

$$ROD(\%) = (D/D_0) \times 100$$

D: OD after exposure test
$D_0$: OD before exposure test
(Measurement conditions: filter: red, light source: D50, viewing angle: 2 degrees)
Evaluation Criteria
Grade A: ROD equal to or higher 90%
Grade B: ROD equal to or higher 80% and lower than 90%
Grade C: ROD equal to or higher 70% and lower than 80%
Grade D: ROD lower than 70%
Evaluation of Coloring Property Printing was performed using the cartridge, XeroxP (trade name, manufactured by Fuji Xerox Co., Ltd.) containing ink compositions described in Examples and Comparative Examples, and the OD of the resulting printing matter was measured using a reflection density meter, Spectrolino (trade name, manufactured by GRETAG MACBETH) and then evaluated based on the following evaluation criteria.
Evaluation Criteria
Grade A: OD equal to or higher 1.10
Grade B: OD equal to or higher 1.05 and lower than 1.10
Grade C: OD equal to or higher 1.00 and lower than 1.10
Grade D: OD lower than 1.00

TABLE 7

| | | Example | | | | | | | | | | Comparative Example | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Bronzing resistance | 25° C., 40% RH | A | A | A | A | A | A | A | A | A | A | C | A | A | A |
| Ozone resistance | 40 hours | A | A | A | A | A | A | A | A | A | A | A | C | D | A |
| | 60 hours | B | B | A | A | A | A | B | A | A | A | B | D | D | A |
| | 80 hours | B | B | B | B | B | B | B | A | A | A | B | D | D | A |
| Coloring property | 100% duty part | A | — | A | A | A | A | — | A | A | A | A | A | A | D |
| | 60% duty part | B | — | B | B | B | B | — | B | B | B | B | B | B | D |

Examples B1 to B10 and Comparative Examples B1 to B5

The components for the ink compositions of Examples B1 to B10 and Comparative Examples B1 to B5 were mixed at a mix ratio shown in Table 8, dissolved and filtered under pressure through a membrane filter having a pore diameter of 1 μm to prepare respective ink compositions.

TABLE 8

| | | Examples | | | | | | | | | | Comparative Examples | | | | |
|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 |
| Coloring material | Coloring material A (porphyrazine) | 4 | 1 | | | | | | | | 2 | 4 | 4 | | | |
| | Coloring material B (porphyrazine) | | | 4 | | | | | | | | | | | | |
| | Coloring material C (porphyrazine) | | | | 4 | 4 | 4 | 1 | 2 | 2 | | | | | | |
| | Coloring material D | | | | | | | | | 2 | | | | | | 4 |
| | Coloring material E | | | | | | | | 2 | | | | | | | |
| | Coloring material F | | | | | | | | | | 2 | | | | | |
| | DB199 | | | | | | | | | | | | | | 4 | 4 |

TABLE 8-continued

|  |  | Examples |  |  |  |  |  |  |  |  |  | Comparative Examples |  |  |  |  |
|---|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 | 5 |
| Organic solvent | Glycerin | 10 | 5 | 10 | 10 | 10 | 10 | 5 | 10 | 10 | 10 | 10 | 10 | 10 | 10 | 10 |
|  | Triethylene glycol | 3 | 5 | 6 | 3 | 3 | 3 | 5 | 3 | 3 | 3 | 3 | 3 | 3 | 3 | 3 |
|  | 2-Pyrrolidone |  | 7 |  |  |  |  | 7 |  |  |  |  |  |  |  |  |
|  | 1,2-Hexanediol |  |  |  | 5 | 5 | 5 |  |  |  |  |  |  |  |  |  |
|  | Olfine E1010 (manufactured by Nissin Chemicals Co.) | 1 | 1 | 1 | 1 | 1 | 1 | 1 | 1 | 1 | 1 | 1 | 1 | 1 | 1 | 1 |
|  | Olfine PD002W (manufactured by Nissin Chemicals Co.) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Diethylene glycol monobutyl ether | 4 |  |  |  |  |  |  |  |  |  |  |  |  |  |  |
|  | Triethylene glycol monobutyl ether | 6 | 7 | 5 | 5 | 5 | 5 | 7 | 10 | 10 | 10 | 10 | 10 | 10 | 10 | 11 |
| Alkali | Triethanolamine | 0.2 | 0.2 | 0.2 | 0.2 | 0.2 | 0.2 | 0.2 | 0.2 | 0.2 | 0.2 | 0.2 | 0.2 | 0.2 | 0.2 | 1.2 |
|  | Sodium hydroxide |  |  |  |  |  |  |  |  |  |  | 0.9 |  |  |  |  |
|  | Lithium hydroxide (monohydrate) | 1 | 0.5 | 1 | 1 | 1 | 1 | 0.5 | 1 | 1 | 1 |  |  | 1 |  | 1 |
| Anti-bronzing additive | 2-Naphthoic acid | 4 | 2 | 4 | 4 |  |  | 2 | 4 | 4 | 4 | 4 |  | 4 |  | 4 |
|  | 3-Hydroxy-2-naphthoic acid |  |  |  |  | 4 |  |  |  |  |  |  |  |  |  |  |
|  | 6-Hydroxy-2-naphthoic acid |  |  |  |  |  | 4 |  |  |  |  |  |  |  |  |  |
| Antiseptic | Proxel XL-2 (manufactured by Arch chemicals, Japan, inc.) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
|  | Water | Balance | Balance | Balance | Balance | Balance | Balance | Balance | Balance | Balance | Balance | Balance | Balance | Balance | Balance | Balance |

Unit: mass %

In addition, respective components of the ink composition shown in Table 8 are represented in % by mass with respect to the total amount of the ink composition and the balance is water. In addition, in the table, A to C are Na salts of porphyrazine compounds of Preparation Examples 1 to 3 and the coloring materials D to F are compounds F to H in Table 5 above.

The ink compositions described in Examples B1 to B10 and Comparative Examples B1 to B4 were added to a cartridge (Cyan chamber) for ink compositions, using an ink jet printer, PM-G800 (manufactured by Seiko Epson Corporation) and were printed onto recording media, and the evaluation was performed. The results are shown in Table 9.

Evaluation of Bronzing

Glossiness of printing matters on which beta printing (Duty 100%) at an input of 1.9 mg/in $CH_2$ on photo paper CRISPIA (trade name, manufactured by Seiko Epson Corporation, model number: KA450SCKR) could be performed using the cartridge were measured at a measurement angle of 60 degrees using a gloss meter (PG-1M: manufactured by Nippon Denshoku Industries Co., Ltd.). Here, "duty" is a value calculated by the following equation.

duty(%)=number of actually recorded dots/(height resolution×width resolution)×100

(wherein a number of actually recorded dots represents a number of actually recorded dots in a unit area and "height resolution" and "width resolution" represent a resolution recorded in a unit area.) The printing was carried out under an environment of 25° C. and 40% RH (the value calculated from the resulting glossiness and the following equation was used for evaluation of bronzing).

Value for evaluation of bronzing=glossiness(printing matter)−glossiness(recording medium)

Evaluation Criteria

Grade A: lower than 15
Grade B: equal to or higher than 15 and lower than 35
Grade C: equal to or higher than 35 and lower than 55
Grade D: equal to or higher than 55

Evaluation of Ozone Resistance

Printing was performed on photo paper CRISPIA (trade name, manufactured by Seiko Epson Corporation, model number: KA450SCKR) using the cartridge at a duty controlled to adjust optical density (OD) to 1.0, and the resulting printing matter was exposed for a predetermined period (40, 60, 80 hours) under conditions of 24° C., relative humidity 60% RH, and an ozone concentration of 5 ppm using an ozone weather meter OMS-H (trade name, Suga tester (manufactured by Suga Test Instruments Co., Ltd.).

After exposure, the OD of each printing matter was measured using a reflection density meter, Spectrolino (trade name, manufactured by GRETAG MACBETH) and the relative optical density (ROD) was calculated in accordance with the following equation and then evaluated based on the evaluation criteria.

$ROD(\%)=(D/D_0)\times 100$

D: OD after exposure test
$D_0$: OD before exposure test
(Measurement conditions: filter: red, light source: D50, viewing angle: 2 degrees)

Evaluation Criteria
Grade A: ROD equal to or higher 90%
Grade B: ROD equal to or higher 80% and lower than 90%
Grade C: ROD equal to or higher 70% and lower than 80%
Grade D: ROD lower than 70%
Clogging Resistance The ink compositions described in Examples and Comparative Examples were added to an ink jet printer, PM-G800 (manufactured by Seiko Epson Corporation), printing was continuously performed for 10 minutes, and printing was ceased after ejection of an ink from a nozzle was confirmed. Without capping the head, the printer was allowed to stand under an environment of 40° C. and 25% RH for 2 weeks. After standing, the nozzle was cleaned and printing was then performed. The clogging property of ink was evaluated based on the number of cleaning operations required for removing printing defects such as blurring and missing.

Evaluation Criteria
Grade A: printing defects such as blurring and missing are removed by 1 to 5 times cleaning operations.
Grade B: printing defects such as blurring and missing are removed by 6 to 10 times cleaning operations.
Grade C: printing defects such as blurring and missing are removed by 11 to 15 times cleaning operations.
Grade D: printing defects such as blurring and missing are removed by 16 or more times cleaning operations.

Evaluation of Coloring Property

Printing was performed using the cartridge, XeroxP (trade name, manufactured by Fuji Xerox Co., Ltd.) containing ink compositions described in Examples and Comparative Examples, and the OD of the resulting printing matter was measured using a reflection density meter, Spectrolino (trade name, manufactured by GRETAG MACBETH) and then evaluated based on the following evaluation criteria.

Evaluation Criteria
Grade A: OD equal to or higher 1.10
Grade B: OD equal to or higher 1.05 and lower than 1.10
Grade C: OD equal to or higher 1.00 and lower than 1.10
Grade D: OD lower than 1.00

[Chem. 1]

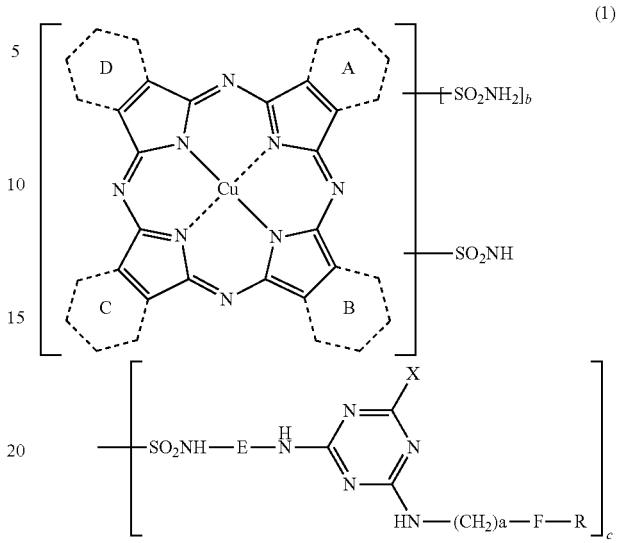

(wherein rings A to D represented by broken lines each independently represent a benzene ring or a 6-membered nitrogen-containing heteroaromatic ring, each of which is condensed with a porphyrazine ring, wherein the average value of the number of the nitrogen-containing heteroaromatic rings is higher than 0.00 and equal to or lower than 3.00, and the remaining are benzene rings, E represents a C2-C12 alkylene, X represents a sulfoanilino group, a carboxyanilino group, a phosphonoanilino group, a sulfonaphthylamino group, a carboxynaphthylamino group or a phosphononaphthylamino group, each of which may have one or two substituent groups selected from the group consisting of a sulfo group, a carboxy group, a phosphate group, a sulfamoyl group, a carbamoyl group, a hydroxy group, a C1-C6 alkoxy group, an amino group, a mono(C1-C4) alkylamino group, a di(C1-C4)alkylamino group, a mono(C6-C10)arylamino group, a di(C6-C10)arylamino group, a C1-C3 alkylcarbonylamino group, a ureide group, a C1-C6 alkyl group, a nitro group, a cyano group, a halogen atom, a C1-C6 alkylsulfonyl group, and a C1-C6 alkylthio group, R represents a hydrogen atom; a sulfo group; a carboxy group; a phosphate group; a sulfamoyl group; a carbam-

TABLE 9

| | | Example | | | | | | | | | | Comparative Example | | | | |
|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 |
| Bronzing resistance | 25° C., 40% RH | A | A | A | A | A | A | A | A | A | A | C | A | A | A |
| | 32° C., 65% RH | A | A | B | A | A | A | A | A | A | A | C | D | A | A | C |
| Ozone resistance | 40 hours | A | A | A | A | A | A | A | A | A | A | A | C | D | A |
| | 60 hours | B | B | A | A | A | A | B | A | A | A | B | B | D | D | A |
| | 80 hours | B | B | B | B | B | B | B | A | A | A | B | B | D | D | A |
| Clogging resistance | | A | A | A | A | A | A | A | A | A | A | C | A | A | A | A |
| Coloring property | 100% duty part | A | — | A | A | A | A | — | A | A | A | A | A | A | A | D |
| | 60% duty part | B | — | B | B | B | B | — | B | B | B | B | B | B | B | D |

What is claimed is:

1. An ink composition comprising:

a porphyrazine compound represented by Formula (1) below or a salt thereof and an aromatic compound having a carboxy group and/or a salt thereof, oyl group; a hydroxy group; a C1-C6 alkoxy group; an amino group; a mono(C1-C6)alkylamino group; a di(C1-C6)alkylamino group; a monoarylamino group; a diarylamino group; a C1-C3 alkylcarbonylamino group; a ureide group; a C1-C6 alkyl group; a nitro group; a cyano group; a halogen atom; a C1-C6 alkylsulfonyl group; or an alkylthio group, F (group) represents a phenyl group, or a 6-membered nitrogen-containing heteroaromatic ring, a represents an integer of 1 to 6, b represents an average value equal to or higher than 0.00 and lower than 3.90, c represents an average value equal to or higher than 0.10 and lower than 4.00, and an average value of a total of b and c is equal to or higher than 1.00 and is lower than 4.00), and a compound represented by Formula (2) below,

[Chem. 2]

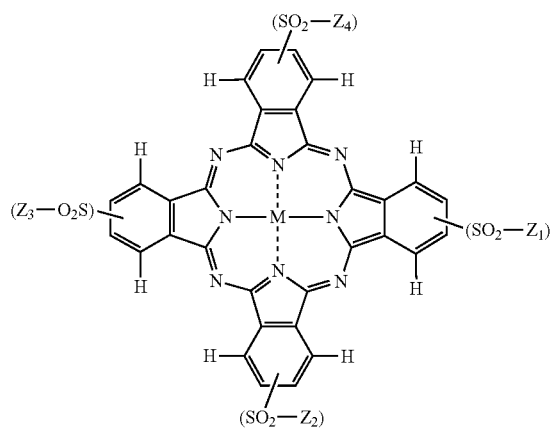

(2)

(wherein M represents a hydrogen atom, a metal element, metal oxide, metal hydroxide, or metal halide, and $Z_1$ to $Z_4$ each independently represent an alkyl group, a cycloalkyl group, an alkenyl group, an aralkyl group, an aryl group, or a heterocyclic group, particularly, an alkyl group, an aryl group or a heterocyclic group, each of which may further have a substituent group).

2. The ink composition according to claim 1, wherein, in the porphyrazine compound represented by Formula (1) or a salt thereof, the nitrogen-containing heteroaromatic ring of rings A to D each independently represents a pyridine ring condensed at 2-position and 3-position, or 3-position and 4-position; or a pyrazine ring condensed at 2-position and 3-position, E represents linear C2-C4 alkylene, X represents a sulfoanilino group which may contain, as a substituent group, 1 or 2 types of 0 to 2 substituent groups selected from the group consisting of a sulfo group, a carboxy group, a hydroxy group, a C1-C6 alkoxy group, an amino group, a mono(C1-C4)alkylamino group, a di(C1-C4)alkylamino group, a C1-C3 alkylcarbonylamino group, a nitro group, a halogen atom, a C1-C6 alkylsulfonyl group and an alkylthio group; a carboxyanilino group which may contain, as a substituent group, 1 or 2 types of 0 to 2 substituent groups selected from the group consisting of a sulfo group, a carboxy group, a hydroxy group, and a sulfamoyl group; a phosphonoanilino group; or a sulfonaphthylamino group which may contain, as a substituent group, 1 or 2 types of 0 to 2 substituent groups selected from the group consisting of a sulfo group and a hydroxy group, R represents a hydrogen atom; a sulfo group; a carboxy group; a C1-C6 alkoxy group; a C1-C6 alkyl group; or a halogen atom, F (group) represents a phenyl group; or a pyridyl group in which R represents a hydrogen atom, and a represents an integer of 1 or 2.

3. An ink jet recording method comprising ejecting droplets of an ink composition and adhering the droplets to a recording medium to perform recording, wherein the ink composition according to claim 2 is used as the ink composition.

4. The ink composition according to claim 1, wherein in the porphyrazine compound represented by Formula (1) or a salt thereof, the nitrogen-containing heteroaromatic ring of rings A to D each independently represents a pyridine ring condensed at 2-position and 3-position, E represents ethylene, X represents a sulfoanilino group which may contain zero to one sulfo group as a substituent group; or a sulfonaphthylamino group which may contain two sulfo groups as substituent groups, R represents a hydrogen atom, a sulfo group or a carboxy group, F (group) represents a phenyl group, or a pyridyl group in which R represents a hydrogen atom, a represents an integer of 1, b represents an average value equal to or higher than 0.00 and lower than 3.90, c represents an average value equal to or higher than 0.10 and lower than 4.00, and an average value of a total of b and c is equal to or higher than 1.00 and is lower than 4.00.

5. An ink jet recording method comprising ejecting droplets of an ink composition and adhering the droplets to a recording medium to perform recording, wherein the ink composition according to claim 4 is used as the ink composition.

6. The ink composition according to claim 1, wherein the aromatic compound having a carboxy group and/or a salt thereof is a compound having a naphthalene skeleton and/or a salt thereof.

7. An ink jet recording method comprising ejecting droplets of an ink composition and adhering the droplets to a recording medium to perform recording, wherein the ink composition according to claim 6 is used as the ink composition.

8. The ink composition according to claim 1, wherein the compound having a naphthalene skeleton and/or a salt thereof is one or two selected from the group consisting of 1-hydroxy-2-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid and salts thereof.

9. An ink jet recording method comprising ejecting droplets of an ink composition and adhering the droplets to a recording medium to perform recording, wherein the ink composition according to claim 8 is used as the ink composition.

10. The ink composition according to claim 1, wherein the aromatic compound having a carboxy group and/or a salt thereof is present in an amount of 0.1 to 10% by mass, based on the total amount of the ink composition.

11. An ink jet recording method comprising ejecting droplets of an ink composition and adhering the droplets to a recording medium to perform recording, wherein the ink composition according to claim 10 is used as the ink composition.

12. The ink composition according to claim 1, wherein the aromatic compound having a carboxy group is a lithium salt.

13. An ink jet recording method comprising ejecting droplets of an ink composition and adhering the droplets to a recording medium to perform recording, wherein the ink composition according to claim 12 is used as the ink composition.

14. The ink composition according to claim 1, further comprising a nonionic surfactant.

15. The ink composition according to claim 1, further comprising a permeation accelerator.

16. An ink jet recording method comprising ejecting droplets of an ink composition and adhering the droplets to a recording medium to perform recording, wherein the ink composition according to claim 1 is used as the ink composition.

17. A recorded material recorded by the recording method according to claim 16.

18. A recorded material recorded using the ink composition according to claim 1.

* * * * *